(12) United States Patent
Watahiki

(10) Patent No.: US 8,269,435 B2
(45) Date of Patent: Sep. 18, 2012

(54) MOTOR CONTROL UNIT, MOTOR CONTROL METHOD AND IMAGE FORMING APPARATUS

(75) Inventor: Tatsuya Watahiki, Kanagawa (JP)

(73) Assignee: Ricoh Company, Ltd, Tokyo (JP)

( * ) Notice: Subject to any disclaimer, the term of this patent is extended or adjusted under 35 U.S.C. 154(b) by 869 days.

(21) Appl. No.: 12/292,893

(22) Filed: Nov. 28, 2008

(65) Prior Publication Data

US 2009/0140682 A1    Jun. 4, 2009

(30) Foreign Application Priority Data

Nov. 30, 2007    (JP) ................................. 2007-311527
Nov. 21, 2008    (JP) ................................. 2008-298822

(51) Int. Cl.
     *G03G 15/00*      (2006.01)
(52) U.S. Cl. ........................................ 318/163; 318/484
(58) Field of Classification Search .......... 318/162–164, 318/461, 484; 388/904; 399/38, 75, 76, 399/208, 227, 279, 313, 357
See application file for complete search history.

(56) References Cited

U.S. PATENT DOCUMENTS

| 4,066,941 | A | * | 1/1978 | Foster | 388/809 |
| 4,513,232 | A | * | 4/1985 | Safiuddin | 318/561 |
| 5,250,884 | A | * | 10/1993 | Okumura | 318/560 |
| 5,398,298 | A | * | 3/1995 | Ensor | 388/811 |
| 6,335,603 | B1 | * | 1/2002 | Otsuka et al. | 318/571 |
| 6,823,132 | B2 | * | 11/2004 | Saito et al. | 388/806 |
| 6,906,487 | B2 | * | 6/2005 | de Frutos | 318/468 |
| 2001/0035730 | A1 | * | 11/2001 | Yoshikawa et al. | 318/685 |
| 2006/0202646 | A1 | * | 9/2006 | Kojima | 318/34 |
| 2007/0007925 | A1 | * | 1/2007 | Yamane | 318/600 |
| 2007/0231009 | A1 | | 10/2007 | Watahiki | |

FOREIGN PATENT DOCUMENTS

| JP | 4-255867 | 9/1992 |
| JP | 5-249774 | 9/1993 |

* cited by examiner

*Primary Examiner* — Bentsu Ro
(74) *Attorney, Agent, or Firm* — Harness, Dickey & Pierce, P.L.C.

(57) ABSTRACT

Time information indicates time required for reflecting a speed control indicating value actually on the rotation speed of the motor, the speed control indicating value being read by a motor driving part and then, being reflected on the rotation speed of the motor by the motor driving part. the speed control indicating value is generated based on the time information and the rotation speed information. The speed control indicating value is read at a period which is based on the time information for actually driving the motor.

6 Claims, 14 Drawing Sheets

MOTOR CONTROL UNIT, MOTOR CONTROL METHOD AND IMAGE FORMING APPARATUS

BACKGROUND OF THE INVENTION

1. Field of the Invention

The present invention relates to a motor control unit and a motor control method for controlling rotation speed of a motor based on a rotation output signal output according to rotation of the motor, and an image forming apparatus using the motor control unit and the motor control method.

2. Description of the Related Art

In the related art, a MFP (Multi-Function Peripheral) is known having functions such as a copy function, a facsimile function, a printer function, a scanner function, a function of delivering an input image (i.e., an original image read by the scanner function, or input by means of the printer function or the facsimile function) and so forth. In such an MFP, a motor having high accuracy is required. For example, when rotation speed of an intermediate transfer belt motor which drives an intermediate transfer belt changes, color drift, or distortion in an image may occur. Therefore, the intermediate transfer belt motor may be controlled in such a manner that target speed is kept as a result of the motor being controlled based on a difference between a rotation output signal output according to rotation of the motor and the target speed signal.

However, in such a manner of controlling a motor based on a difference between a rotation output signal of a motor and a target speed signal, control is carried out at resolution of the rotation output signal of the motor. Therefore, in a case where a period of the rotation output signal is large, it may not be possible to carry out the control with high accuracy.

Japanese Laid-Open Patent Application 04-255867 discloses an art in which, a timer 1107 having a frequency higher than a frequency of a rotation output signal SG1001 (encoder pulse) is used to improve accuracy of control. With reference to FIGS. 13 and 14, the prior art of Japanese Laid-Open Patent Application 04-255867 will now be described. FIG. 13 depicts a functional block diagram of a motor control unit in the prior art.

In FIG. 13, when the rotation output signal SG1001 is output based on rotation of a motor 1021, an input capture 1101 (i.e., a high speed interconnect or an HSI unit) stores information as to how many times counting is carried out by a free-run timer 1111 for a rising edge of the rotation output signal SG1001, in a memory (i.e., a first in first out, or a FIFO) 111. The free-run timer has a frequency sufficiently higher than a frequency of the rotation output signal SG1001.

A CPU (i.e., a control processing unit) 1110 is interrupted by a software timer at a time of the end of a predetermined sampling interval. When being interrupted, the CPU 1110 uses the value which has been stored in the memory as mentioned above and a timer value for an interval from an immediately preceding rising edge of the rotation output signal SG1001 up to the interruption, to calculate an average frequency of the rotation output signal SG1001 in the sampling interval. Further, the CPU uses the average frequency to calculate a speed control indicating value D1004 (i.e., encoder feedback indicating value) to be output to a PWM (i.e., a pulse width modulation) timer 1104 for a motor 1021. Based on the speed control indicating value D1004, the motor 1021 is controlled. Thus, higher control accuracy is attempted.

SUMMARY OF THE INVENTION

According to the present invention, in order to further improve control accuracy, a motor control unit for carrying out control of rotation speed of a motor based on a rotation output signal output according to rotation of the motor includes a storing part configured to store time information indicating time required for reflecting a speed control indicating value on rotation speed of the motor, the speed control indicating value being read by a motor driving part and then, being reflected on rotation speed of the motor by the motor driving part; a rotation speed information generating part configured to generate rotation speed information based on reception of the rotation output signal; a speed control indicating value generating part configured to generate the speed control indicating value based on the time information and the rotation speed information; and the motor driving part configured to read the speed control indicating value at a period which is based on the time information, and drive the motor based on the speed control indicating value.

Other objects, features and advantages of the present invention will become more apparent from the following detailed description when read in conjunction with the accompanying drawings.

DESCRIPTION OF REFERENCE NUMERALS

Figure 1:
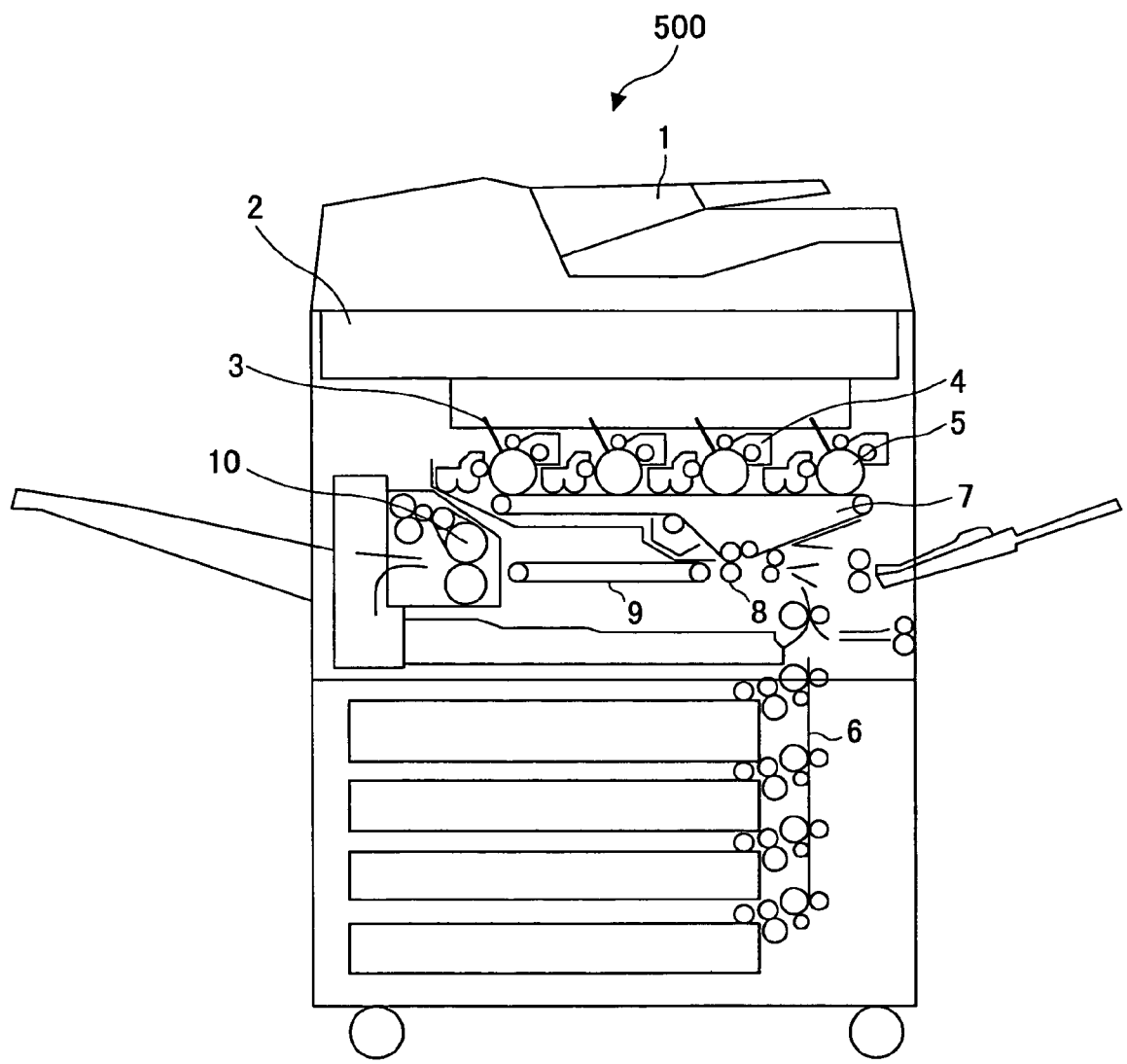
FIG. 1 depicts a hardware configuration of one example of an image forming apparatus in a first embodiment.

1 AUTOMATIC DRAFT FEEDER
2 SCANNER UNIT
3 IMAGE WRINGING UNIT
4 DEVELOPING UNIT
5 PHOTOSENSITIVE MEMBER UNIT
6 PAPER FEEDING UNIT

7 PRIMARY TRANSFER UNIT
8 SECONDARY TRANSFER ROLLER
9 CONVEYANCE BELT
10 FIXING UNIT
21 MOTOR
22 MOTOR CONTROL UNIT
23 GEAR
24 PRIMARY TRANSFER DRIVING ROLLER
25 INTERMEDIATE TRANSFER BELT
26 SECOND TRANSFER ROLLER
27 ENCODER
28 SCALE SENSOR
101 INPUT CAPTURE (ONE EXAMPLE OF ROTATION SPED INFORMATION GENERATING PART)
102 CONTROL PART (ONE EXAMPLE OF SPEED CONTROL INDICATING VALUE GENERATING PART)
103 REGISTER
104 PWM TIMER (ONE EXAMPLE OF A PART OF MOTOR DRIVING PART)
105 MOTOR DRIVER (ONE EXAMPLE OF ANOTHER PART OF THE MOTOR DRIVING PART)
106 REGISTER (INSIDE OF THE PWM TIMER)
107 FREE-RUN TIMER
108 CONTROL PERIOD TIMER (ONE EXAMPLE OF CONTROL PERIOD SIGNAL GENERATING PART)
109 FLASH MEMORY (ONE EXAMPLE OF STORING PART)
110 CPU
111 MEMORY
112 RAM
113 ROM
201 LOAD TIMING SIGNAL GENERATING TIMER (ONE EXAMPLE OF LOAD TIMING SIGNAL GENERATING PART)
202 REGISTER (INSIDE OF THE LOAD TIMING SIGNAL GENERATING TIMER)
500 IMAGE FORMING APPARATUS
SG1 ROTATION OUTPUT SIGNAL
SG2 INPUT CAPTURE INTERRUPT SIGNAL
SG3 CLOCK SIGNAL
SG4 CLOCK SIGNAL
SG5 CONTROL PERIOD SIGNAL
SG6 PWM SIGNAL
SG201 LOAD TIMING SIGNAL
D1 TIMER VALUE
D2 CAPTURE VALUE (ONE EXAMPLE OF ROTATION SPEED INFORMATION)
D3 TIME INFORMATION (PERIOD INFORMATION OF SG5)
D4 SPEED CONTROL INDICATING VALUE
D203 TIME INFORMATION (EXPECTED LONGEST CALCULATION TIME+PREDETERMINED MARGIN TIME)
D303 TIME INFORMATION (DELAY TIME OF LOAD TIMING SIGNAL GENERATING TIMER AFTER CONTROL PART CARRIES OUT PROCESS)
T1 PERIOD (PERIOD OF ROTATION OUTPUT SIGNAL)
T2 INTERPOLATION TIME
T3 INTERPOLATION TIME (PERIOD OF SG5)
T203 INTERPOLATION TIME (DELAY TIME OF LOAD TIMING SIGNAL GENERATING TIMER)
T303 INTERPOLATION TIME (DELAY TIME OF LOAD TIMING SIGNAL GENERATING TIMER, MONOCHROME MODE)
T304 INTERPOLATION TIME (DELAY TIME OF LOAD TIMING SIGNAL GENERATING TIMER, COLOR MODE)
V1 AVERAGE ROTATION SPEED
V3 EXPECTED ROTATION SPEED
V203 EXPECTED ROTATION SPEED
V303 EXPECTED ROTATION SPEED (MONOCHROME MODE)
V304 EXPECTED ROTATION SPEED (COLOR MODE)
1021 MOTOR
1105 MOTOR DRIVER
1026 ENCODER
1101 INPUT CAPTURE (HSI UNIT)
1104 PWM TIMER (PULSE MODULATION UNIT)
1107 FREE-RUN TIMER
1110 CPU
1111 MEMORY (FIFO)
SG1001 ROTATION OUTPUT SIGNAL (ENCODER PULSE)
SG1002 INPUT CAPTURE INTERRUPT SIGNAL (INTERRUPT)
SG1003 CLOCK SIGNAL (CLOCK SIGNAL OF MICROCOMPUTER)
SG1006 PWM SIGNAL (CONTROL SIGNAL)
D1001 TIMER VALUE (OCCURRING TIME)
D1002 CAPTURE VALUE (TIME)
D1004 SPEED CONTROL INDICATING VALUE (FEEDBACK INFORMATION OF ENCODER)

DETAILED DESCRIPTION OF THE PREFERRED EMBODIMENTS

In the above-mentioned prior art of Japanese Laid-Open Patent Application 04-255867, control period signal timing (i.e., interrupt timing) is considered. However, a time required for the speed control indicating value D1004 being reflected on the output to the motor driver 1105, i.e., the PWM signal SG1006, is not considered. This point will now be described with reference to FIG. 14.

Figure 14:
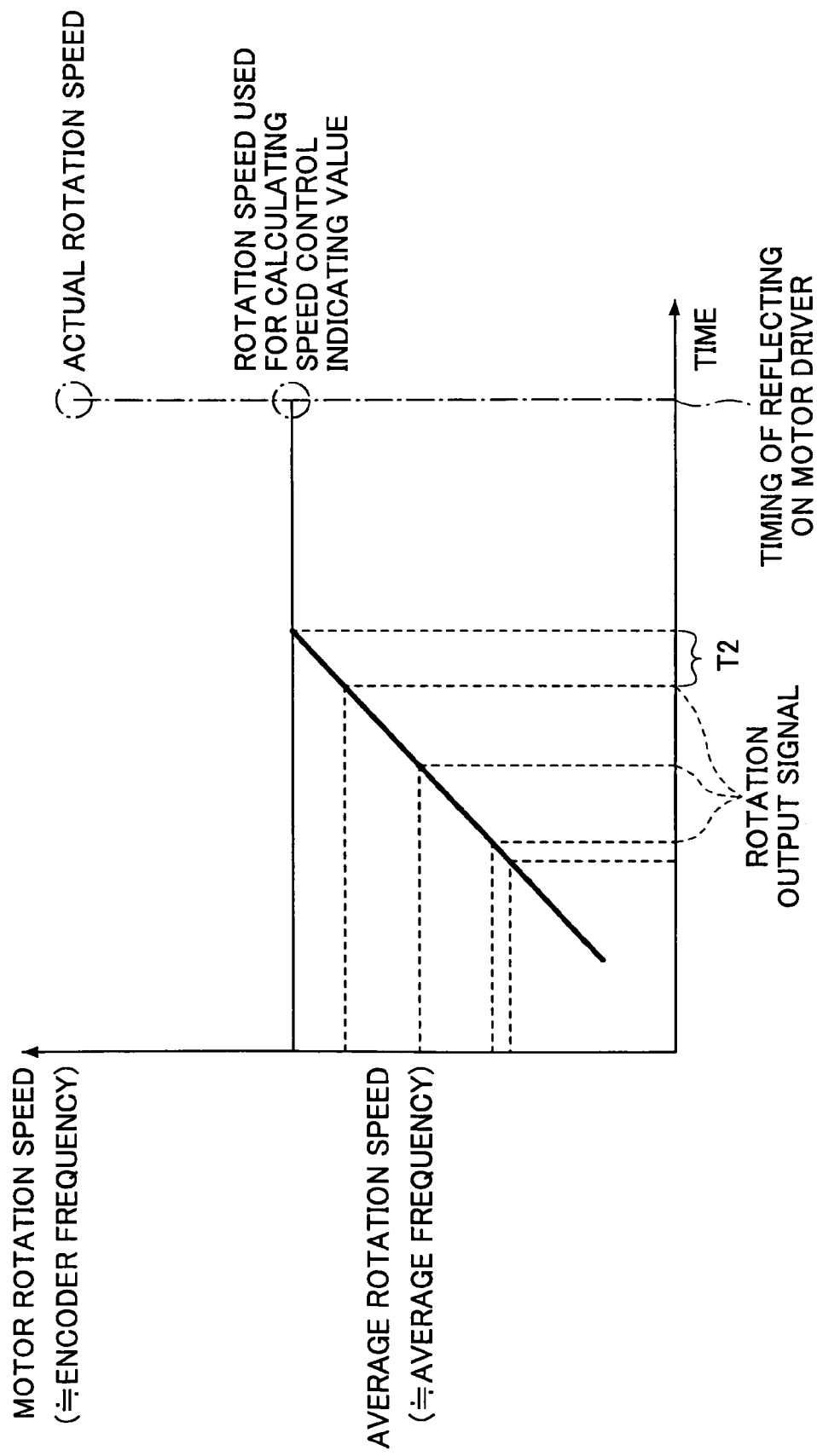
FIG. 14 depicts one example of change in rotation speed in the prior art.

FIG. 14 depicts a graph diagrammatically illustrating a relationship between a time required for the speed control indicating value D1004 being reflected and speed change. As depicted in FIG. 14, when rotation speed of the motor increases gradually, a difference may occur between an expected rotation speed used for calculating the speed control indicating value D1004 and an actual rotation speed. Therefore, precise control may not be achieved. Further, because of a load of the CPU 1110 or such, calculation of the speed control indicating value D1004 may take much time, so that much time may be required for the PWM timer 1004 reflecting the speed control indicating value D1004 on the PWM signal SG1006. In such a case, a considerable difference may occur between an expected average rotation speed used for calculating the speed control indicating value D1004 and an actual rotation speed. Thereby, accuracy in the control may further degrade.

Embodiments which will be described below have been devised for solving such a problem. An object of the embodiments is that, even when rotation speed of the motor is changing, or when relatively long time is required for the PWM timer 1104 reflecting the speed control indicating value D1004 on the PWM signal SG1006, accuracy in the control can be improved.

In an embodiment, for achieving the above-mentioned object, a motor control unit for carrying out control of rotation speed of a motor based on a rotation output signal output according to rotation of the motor, has a storing part configured to store time information indicating a time required for reflecting a speed control indicating value on rotation speed of the motor, the speed control indicating value being read by a motor driving part and then, being reflected on rotation speed of the motor by the motor driving part; a rotation speed information generating part configured to generate rotation speed information based on reception of the rotation output signal; a speed control indicating value generating part configured to generate the speed control indicating value based on the time information and the rotation speed information; and the motor driving part configured to read the speed control indicating value at a period which is based on the time information, and drive the motor based on the speed control indicating value.

This motor control unit may further have a control period signal generating unit which generates a control period signal based on the time information, the speed control indicating value generating part may generate the speed control indicating value based on the control period signal, and, the motor driving part, based on reception of the control period signal, may read the speed control indicating value.

Alternatively, the motor control unit may have a control period signal generating part configured to generate a control period signal at a predetermined period, and a load timing signal generating part configured to generate a load timing signal by converting the control period signal into the load timing signal. The speed control indicating value generating part may generate the speed control indicating value based on reception of the control period signal, and the motor driving part may read the speed control indicating value based on reception of the load timing signal.

Further, in a case where an image forming apparatus provided with the motor control unit is provided, a designating part configured to designate a predetermined mode from a plurality of modes respectively requiring different loads of the motor control unit during an image forming process in the image forming apparatus, and a time information setting part configured to set the time information based on the predetermined mode selected by the selecting part, may be provided. The plurality of modes may include a monochrome mode and a color mode.

In the above-mentioned configuration of the embodiment, the motor driving part reads the speed control indicating value based on the time information which indicates a time required for reflecting the speed control indicating value on rotation speed of the motor. The time information is stored by the storing part. Therefore, the speed control indicating value generating part expects, by calculating, rotation speed of the motor at a time when the motor driving part reflects the speed control indicating value on the rotation speed of the motor, based on the time required for the motor driving part reflecting the speed control indicating value on the rotation speed of the motor. Then, with the use of the thus-calculated expected rotation speed, the speed control indicating value is calculated. Therefore, it is possible to carry out control of rotation speed of the motor with high accuracy.

Below, preferred embodiments of a motor control unit and an image forming apparatus will be described in more detail with reference to figures.

[First Embodiment]

With reference to FIGS. 1-5, an image forming apparatus such as a copier, a facsimile machine, a printer, a scanner or a digital MFP (Multi Function Peripheral) having at least two of respective functions of a copier, a facsimile machine, a printer and a scanner will now be described.

FIG. 1 depicts a hardware configuration of one example of the image forming apparatus in the first embodiment. The image forming apparatus 500 depicted in FIG. 1 includes an automatic draft feeder (ADF) 1, a scanner part 2, an image writing unit 3, a developing unit 4, a photosensitive member unit 5, a paper feeding part 6, a primary transfer unit 7, a secondary transfer roller 8, a conveyance belt 9 and a fixing unit 10.

The automatic draft feeder 1 feeds drafts or original document sheets to the scanner part 2, sheet by sheet. The scanner part 2 emits light to the draft, and reads an image of the draft by receiving reflected light from the draft. Data of the image thus read by the scanner part 2 is then sent to the image writing unit 3 as image data after undergoing a predetermined image processing process. The image writing unit 3 includes a LD (Laser Diodes) driven according to the given image data, and a latent image is formed on each photosensitive drum included in the photosensitive member unit 5. The photosensitive member unit 5 includes, because the image forming apparatus is of a full-color type, four photosensitive drums for respective colors of Y (Yellow), M (Magenta), C (Cyan) and Bk (Black). The developing unit 4 develops the latent image formed on each photosensitive drum by causing toner to adhere to the latent image, into a visual toner image.

The toner image thus obtained on each photosensitive drum is transfer to an intermediate transfer belt included in the primary transfer unit 7. In the full-color type, toner images of the above-mentioned four colors are overlaid with one by one. In this case, at a time when the image forming and transfer process has finished for each of the four colors, transfer paper is fed by the paper feeding part 6 in time with rotation of the primary transfer belt. Thus, the respective toner images of the four colors are simultaneously transferred to the transfer paper from the transfer belt between the primary transfer unit 7 and the secondary transfer roller 8. The conveyance belt 9 conveys the transfer paper on which the toner images have been thus transferred. The fixing unit 10 thermally fixes the toner images onto the transfer paper conveyed by the conveyance belt 9.

Figure 2:
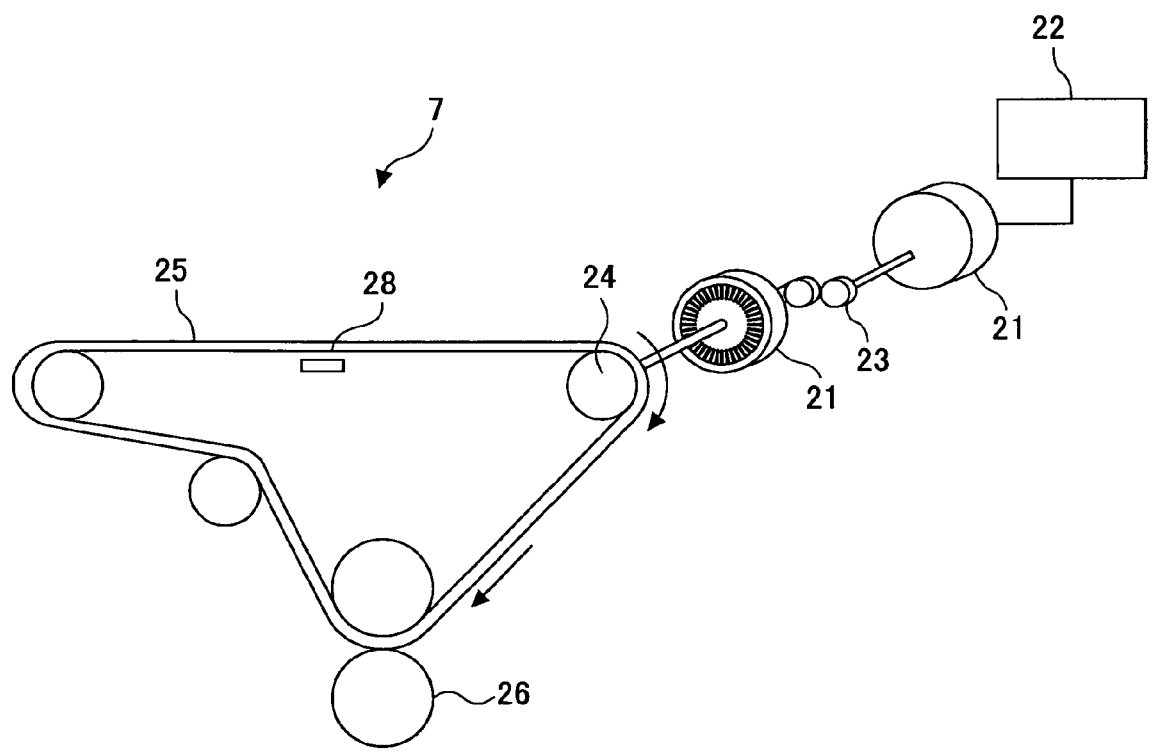
FIG. 2 depicts a hardware configuration of a primary transfer unit and a peripheral thereof to drive the primary transfer unit.

FIG. 2 depicts a configuration of the primary transfer unit 7 depicted in FIG. 1 and a periphery thereof for driving the primary transfer unit 7. A motor 21 is controlled by a motor control unit 22, and drives the primary transfer unit 7. Rotation of the motor 21 is transmitted to a primary transfer driving roller 24 through a gear 23. The intermediate transfer belt 25 rotates as a result of the primary transfer driving roller 24 rotating, and transfers the toner images to the secondary transfer roller 26 (i.e., the secondary transfer roller 8). An encoder 27 generates a pulse-shaped waveform according to rotation speed of the motor 21, and outputs the pulse-shaped waveform as a rotation output signal SG1. Control of rotation speed of the motor 21 is carried out as a result of the rotation output signal being fed back.

Figure 3:
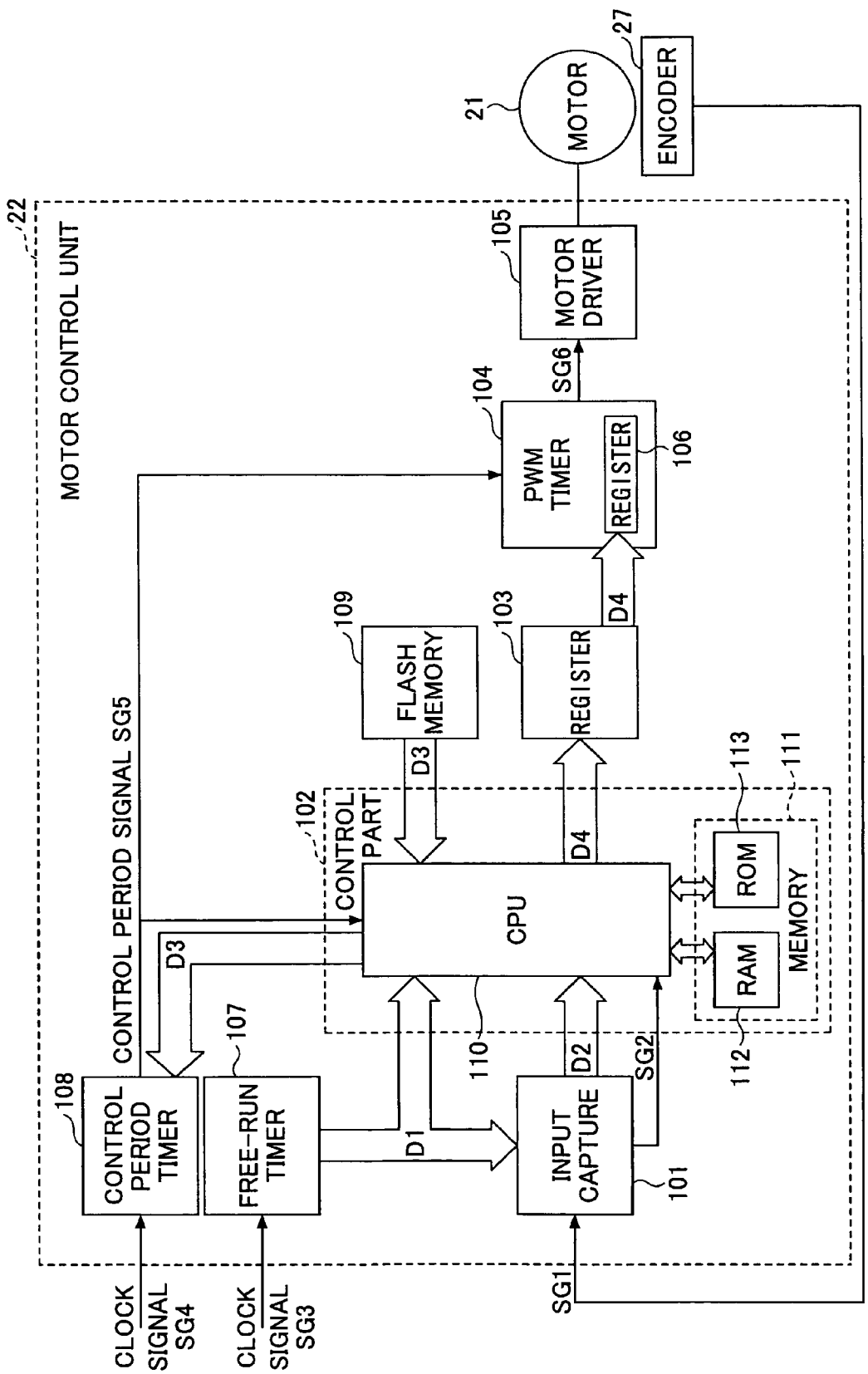
FIG. 3 depicts a motor control unit.

FIG. 3 depicts a block diagram of a configuration of the motor control unit 22 carrying out control of rotation speed of the motor 21. The motor control unit 22 controlling rotation speed of the motor 21 depicted in FIG. 1 includes an input capture 101, a control part 102, a register 103, a PWM timer 104, a motor driver 105, a free-run timer 107, a control period timer 108 and a flash memory 109. In this configuration, rotation speed of the motor 21 is fed back and thus, is controlled. The motor 21 is, for example, a brushless direct current motor.

The free-run timer 107 updates a timer value D1 with a clock signal SG3 having a frequency sufficiently higher than that of the rotation output signal SG1. The input capture 101 holds the timer value D1 of the free-run timer 107 as a capture value D2 at a time of receiving a rising edge of the rotation output signal SG1. Further, the input capture 101 has a function of outputting an input capture interrupt signal SG2 to the control part 102 each time when thus holding the timer value D1.

The control period timer 108 outputs a control period signal SG5 to the control part 102. The flash memory 109 acts as a storing part and stores the time information D3 indicating a period of the control period signal SG5.

The control part 102 includes a CPU 110 acting as a calculating unit, and a memory 111 such as a RAM 112 and a ROM 113 storing various information. When receiving the input capture interrupt signal SG2, the control part 102 reads the capture value D2 held by the input capture 101, and, calculates an average rotation speed V1 of the motor 21 up to reception of a current rising edge of the rotation output signal SG1 based on the read capture value D2, and a capture value D2' held at reception of a once preceding rising edge of the rotation output signal SG1, stored in the RAM 112, and stores the calculated average rotation speed V1. The ROM 112 at least stores average rotation speed values for twice, i.e., the above-mentioned average rotation speed V1 and an average rotation speed V1' of the motor 21 calculated by the control part 102 in the same manner at reception of the once preceding input capture interrupt signal SG2. Further, The RAM 112 at least stores the capture value D2 for once of the input capture interrupt signal SG2. The input capture interrupt signal SG2 is output by the input capture 101 each time of a rising edge of the rotation output signal SG1. Therefore, calculation of the average rotation speed of the motor 21 by the control part 102 is carried out at each time of a rising edge of the rotation output signal SG1.

Further, when receiving the control period signal SG5, the control part 102 starts calculation of the speed control indicating value D4 for the motor driver 105. When receiving the control period signal SG5, the control part 102 reads the timer value D1 of the free-run timer 107 at the time, calculates an expected rotation speed V3 of the motor 21 based on the read timer value D1, the average rotation speeds V1 and V1' for twice of the input capture interrupt signal SG2, and the time information D3 stored in the flash memory 109, and, with the use of a rotation speed difference between the calculated expected rotation speed V3 and a given target rotation speed, calculates the speed control indicating value D4 for the motor driver 105 via the PWM timer 104, i.e., a value indicating rotation speed of the motor 21, according to well-known feedback control technique.

The register 103 temporarily stores the speed control indicating value D4 output by the control part 102. It is noted that, in the embodiment, the register 103 is provided outside of the control part 102. However, the register 103 may be provided inside of the control part 102. The PWM timer 10 has a register 106 inside thereof, and outputs, to the motor driver 105, the PWM signal SG6 based on the speed control indicating value D4 stored in the register 106. When receiving the control period signal SG5, the PWM timer 104 reads the speed control indicating value D4 from the register 103, and stores the read speed control indicating value D4 in the register 106 inside of the PWM timer 104. The speed control indicating value D4 read from the register 103 is used for generating the PWM signal SG6 to be output to the motor driver 105 within a negligibly short time, and thus, is actually reflected on rotation speed of the motor 21 within a negligibly short time. Therefore, a time when the PWM timer 104 reads the speed control indicating value D4 from the register 103 and reflects the speed control indicating value on the PWM signal SG6 which is an output signal to the motor driver 105 can be considered as being coincident with a time when the speed control indicating value D4 is actually reflected on rotation speed of the motor 21. Therefore, the above-mentioned time information can be considered as information indicating a time required for the PWM timer 104 reading the speed control indicating value D4 from the register 103, and reflecting the speed control indicating value D4 on rotation speed of the motor 21 actually.

The motor driver 105 has top and bottom two transistors for each phase of the motor 21, not shown, turning on/off of them is repeated according to the PWM signal SG6 generated by the PWM timer 104, and thus, provides a driving voltage for the motor 21. By the driving voltage, the motor 21 is driven and rotated.

Figure 4:
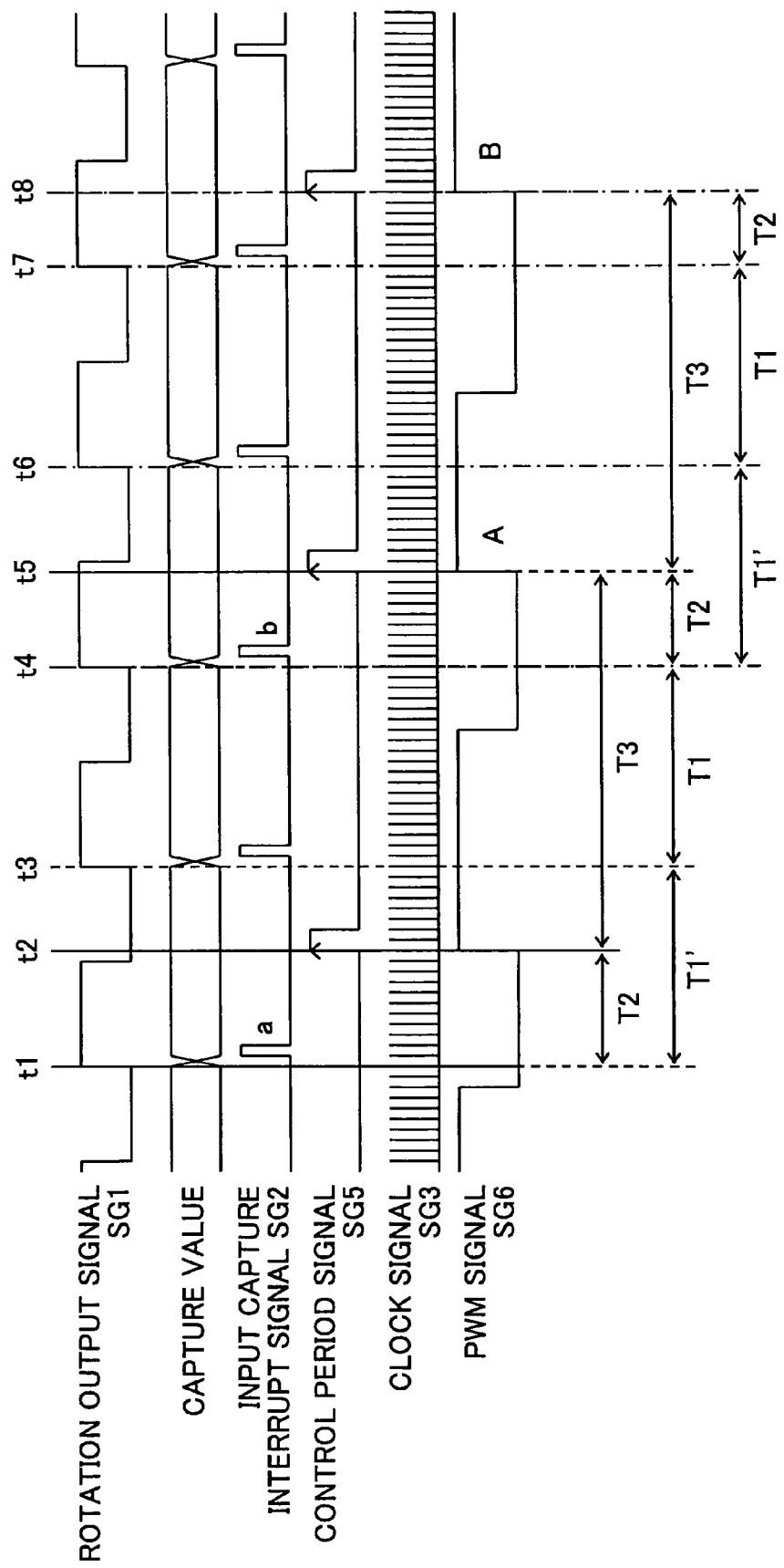
FIG. 4 depicts a timing chart of one example of output timing of each signal.

Next, timing of each signal being output will now be described with reference to FIG. 4. FIG. 4 depicts a timing chart illustrating one example of timing of each signal being output.

The clock signal SG3 has a frequency sufficiently higher than that of the rotation output signal SG1, and increases the timer value D1 of the free-run timer 107. The input capture 101 holds the timer value D1 of the free-run timer 107 at a time (for example, time t3 in FIG. 4) when detecting a rising edge of the rotation output signal SG1 generated according to rotation of the motor 21, and also, transmits the input capture interrupt signal SG2 to the control part 102. The control part 102 reads the capture value D2 from the input capture 101 at a time when receiving the input capture interrupt signal SG2. The control part 102 compares the capture value D2 read from the input capture 101 at the time of the current input capture interrupt signal SG2 (for example, the time t3), with the capture value D2', read in the once preceding input capture interrupt signal SG2 (for example time t1) and stored in the RAM 112. As a result of the comparison, the control part 102 calculates a period T1 (for example, a period T1' between the times t1 and t3 in FIG. 4) of the rotation output signal SG1. Further, the control part 102 calculates the average rotation speed V1 of the motor 21 for one period immediately before an rising edge of the rotation output signal SG1 corresponding to the period T1 of the rotation output signal SG1 calculated above, by dividing by a physical distance of a principle which outputs the rotation output signal SG1. The physical distance of the principle which outputs the rotation output signal SG1 is, for example, a distance between adjacent slits of a slit plate provided on a rotation shaft of the motor 21, in a case where a rotary encoder is used as the encoder 27. The control part 102 stores, in the RAM 112, the thus-calculated average rotation speed V1 and, the capture value D2 read from the input capture 101 at the time t3 for example.

The control part 102 calculates the speed control indicating value D4 at a time of receiving the control period signal SG5 (for example, in FIG. 4, time t5), and outputs the calculated speed control indicating value D4 to the register 103. Specifically, when receiving the control period signal SG5 (for example, the time t5), the control part 102 reads the timer value D1 from the free-run timer 107. Then, by comparing the read timer value D1 with the capture value D2 read at a time of receiving the once preceding rotation output signal SG1 (for example, time t4) and stored in the RAM 112, the control part 102 calculates a time T2 (referred to as an "interpolation time T2", hereinafter) starting from the time of receiving the immediately preceding rotation output signal SG1 (for example, time t4) up to the time of receiving the control period signal SG5 (for example, time t5). Further, the control part 102 reads the average rotation speed V1 of the motor 21 during a period (for example, T1 between time t3 and time t4 of FIG. 4) immediately before the above-mentioned rotation output signal SG1 and the average rotation speed V1' of the motor 21 during a period (for example, T1' between time t1 and time t3 of FIG. 4) of once preceding to immediately before the above-mentioned rotation output signal SG1. By comparing the average rotation speeds V1' and V1 of the motor 21 for the adjacent two periods of the rotation output signal SG1, the control part 102 calculates a change amount of the average rotation speed of the motor 21 along a time axis. Next, the control part 102 uses the calculated change amount of the average rotation speed of the motor 21, the above-mentioned average rotation speeds V1', V1, the interpolation time T2, and the time information D3 (indicating an interpolation time T3) stored in the flash memory 109, to calculate the expected motor rotation speed V3 at a time (for example, time t8) when the PWM timer 104 reads the speed control indicating value D4 from the register 103 and reflects the speed control indicating value D4 on the PWM signal SG6 which is an output signal for the motor driver 105. Specifically, for example, by means of interpolation based on FIG. 5, the expected motor rotation speed V3 is obtained. The control part 102 calculates the speed control indicating value D4, i.e., a value indicating rotation speed of the motor, by means of well-known feedback control technique, based on the calculated expected motor rotation speed V3 and the given target rotation speed stored in the ROM 113. The control part 102 outputs the calculated speed control indicating value D4 to the register 103. A time required for, after receiving the control period signal SG5 (for example, time t5), calculating the speed control indicating value D4 and outputting the speed control indicating value D4 to the register 103, depends on a situation of other processing carried out by the control part 102, and falls within the period of the control period signal SG5.

The PWM timer 104 reads the speed control indicating value D4 from the register 103 at a time (for example, time t8) of receiving the control period signal SG5, and stores the read speed control indicating value D4 in the register 106. The speed control indicating value D4 read at this time (time t8) is the speed control indicating value D4 calculated by the control part 102 at a time (time t5) of the control part 102 receiving the control period signal SG5 which is output by the control period timer 108 once before. The PWM timer 104 generates the PWM signal SG6 based on the speed control indicating value D4 stored in the register 106, and outputs the generated PWM signal SG6 to the motor driver 105. After the speed control indicating value D4 is read from the register 103 and the PWM timer 14 stores the read speed control indicating value D4 in the register 106 at the time t8 for example, the PWM signal SG6 is generated based on the thus-stored speed control indicating value D4. As the PWM timer 104 thus generates the PWM signal SG6 and outputs the PWM signal SG6 to the motor driver 105, the motor driver is driven by the PWM signal SG6, and rotation speed of the motor 21 is controlled so as to be rotation speed according to the speed control indicating value D4.

That is, in FIG. 4, the PWM signal SG6 starting from the time t5 indicated by "A" is generated as a result of the speed control indicating value D4 being calculated with the use of the capture value D2 read by the control part 102 at the input capture interrupt signal SG2 immediately after the time t1 indicated by "a" and the capture value obtained further before. Similarly, the PWM signal SG6 starting from the time t8 indicated by "B" is generated as a result of the speed control indicating value D4 being calculated with the use of the capture value D2 read by the control part 102 at the input capture interrupt signal SG2 immediately after the time t4 indicated by "b" and the capture value obtained further before.

Figure 5:
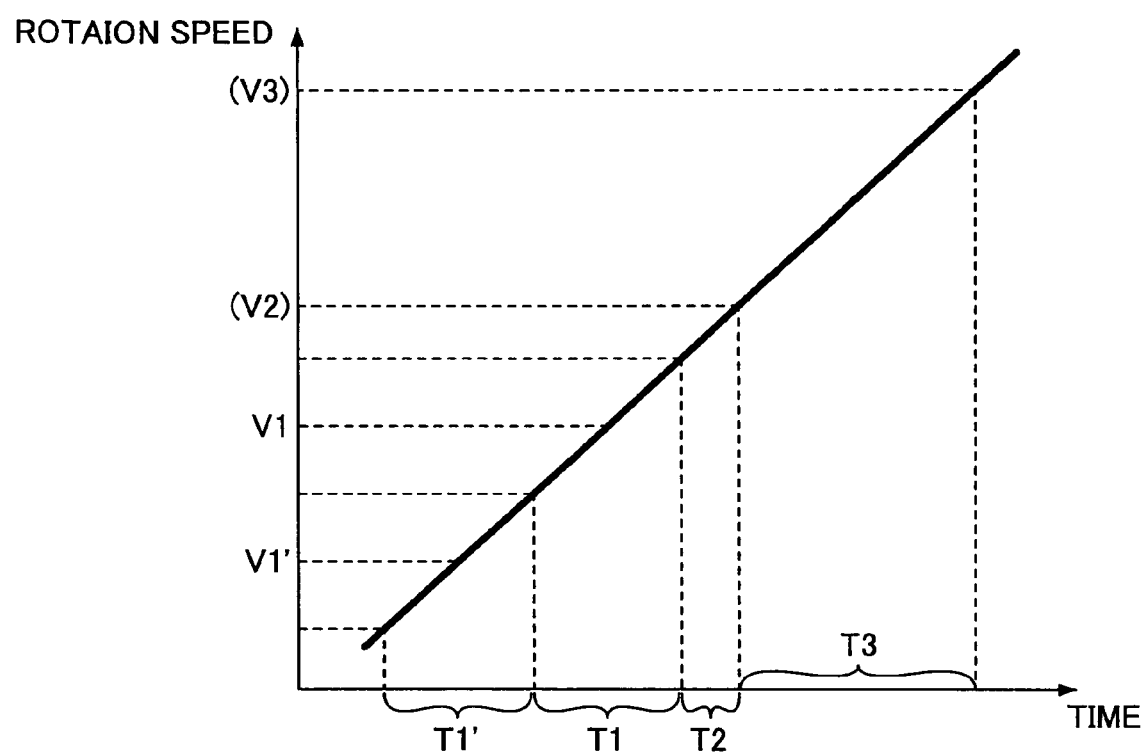
FIG. 5 depicts a graph diagrammatically illustrating a relationship between a time required for reflecting a speed control indicating value on a PWM signal and a rotation speed change.

FIG. 5 depicts a graph which diagrammatically illustrates a relationship between the above-mentioned periods T1' and T1 of the rotation output signal SG1, the average rotation speeds V1' and V1 of the motor 21, and the interpolation times T2 and T3. This graph of FIG. 5 diagrammatically illustrates a relationship between a time required for the speed control indicating value D4 being reflected on the PWM signal SG6 and a change in rotation speed of the motor 21. In the embodiment, when receiving the control period signal SG5 (in the above-mentioned example, at the time t8), the PWM timer 104 reads the speed control indicating value D4 from the register 103. Therefore, the interpolation time t3 of FIG. 5 is the same as the period of the control period signal SG5. The interpolation time T2 is a time which is from reception of the rotation output signal SG1 up to reception of the control period signal SG5, calculated when the control part 102 has received the control period signal SG5. That is, "the interpolation time T2"+"the interpolation time T3" equal to a time which is from when the motor control unit 22 receives the rotation output signal SG1 (in the above-mentioned example, at the time t5), up to when the speed control indicating value D4 is reflected on the PWM signal SG6 (at the time t8).

The control part 102 expects the rotation speed V3 of the motor of a time (for example, the time t8) of the PWM timer 104 reflecting the speed control indicating value D4 on the PWM signal SG6, by means of interpolation based on the average rotation speed V1 in the period T1 (for example, between the times t3 and t4), the average rotation speed V1 in the period T1' (for example, between the times t1 and t3) of the rotation output signal SG1 once before the above-mentioned period T1, stored in the RAM 112, the interpolation time T2 (for example, between the times t4 and t5) and the interpolation time T3 (for example, between the times t5 and t8). It is noted that calculation of the expected rotation speed V3 may be carried out based on more than such two average rotation speeds. Further, based on accumulated errors of average rotation speeds or such, calculation of the expected rotation speed V3 may be carried out more precisely.

Thus, in the embodiment, the flash memory 109 stores the period T3 of the control period signal SG5 as the time information D3. Then, when receiving the control period signal SG5, the PWM timer 104 reads the speed control indicating value D4 from the register 103, and reflects the speed control indicating value D4 on the PWM signal SG6. Therefore, by reading the time information D3 from the flash memory 109, the control part 102 can grasp a time of the PWM timer 104 reflecting the speed control indicating value D4 on the PWM signal SG6. Therefore, the control part 102 can calculate the speed control indicating value D4 with the use of the expected rotation speed V3 of the time of the speed control indicating value D4 being reflected on the PWM signal SG6, and thus, controls rotation speed of the motor 21. Accordingly, it is possible to control rotation speed of the motor 21 more precisely.

[Second Embodiment]

Next, with reference to FIGS. 6-8, a second embodiment will be described. It is noted that, the same reference numerals are given to configurations identical to those of the above-described first embodiment, and duplicate description will be omitted.

In the first embodiment, the flash memory 109 stores the period T3 of the control period signal SG5 as the time information D3. Therefore, the control part 102 can know a time of the PWM timer 104 reading the speed control indicating value D4 from the register 103, by reading the time information D3 from the flash memory 109. Thereby, rotation speed V3 of the motor at a time of the PWM timer 104 reflecting the speed control indicating value D4 on the PWM signal SG6 can be expected. However, in the first embodiment, when a time from when the control part 102 receives the control period signal SG5 up to when the PWM timer 104 reflecting the speed control indicating value D4 on the PWM signal SG6 is long, and rotation speed of the motor 21 changes during the time, an error may occur between the expected rotation speed V3 and an actual rotation speed of the motor at the time of the speed control indicating value D4 being reflected on the PWM signal SG6. In the second embodiment, in order to reduce a factor for such an error, and to more precisely carry out control, a time from when the control part 102 receives the control period signal SG5 up to when the PWM timer 104 reflects the speed control indicating value D4 on the PWM signal SG6 is set as an expected longest time (referred to as an expected longest calculation time, hereinafter) required for the control part 102 to carry out calculation of the speed control indicating value D4. In this point, the second embodiment is different from the first embodiment.

Figure 6:
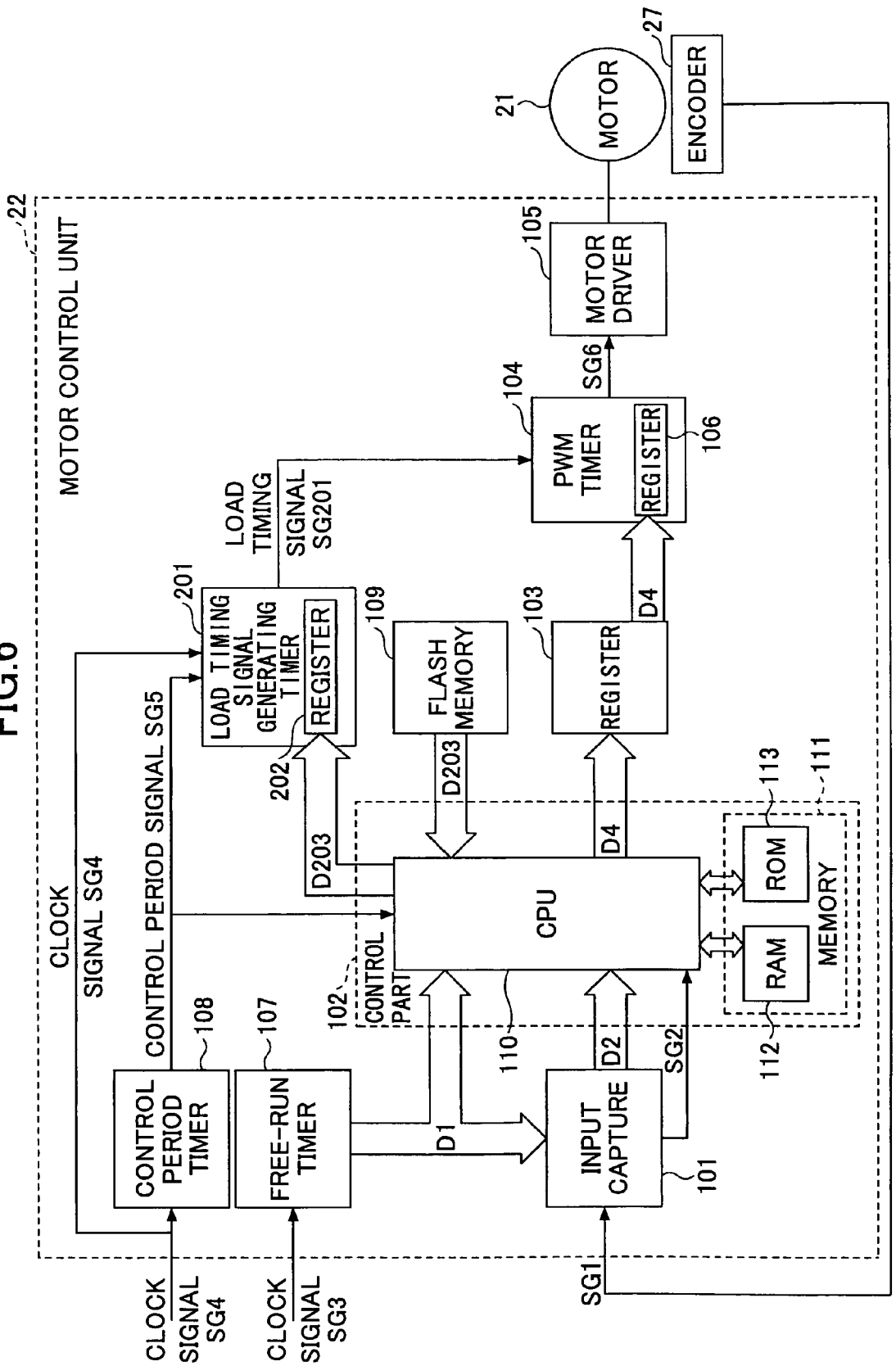
FIG. 6 depicts a block diagram of a configuration of a motor control unit in a second embodiment.

FIG. 6 depicts a block diagram illustrating a configuration of the motor control unit 22 in the second embodiment for carrying out control of rotation speed of the motor 21. As depicted in FIG. 6, the motor control unit 22 in the second embodiment includes a load timing signal generating timer 201. The load timing signal generating timer 201 outputs a load timing signal SG201 for delaying a predetermined time from when receiving the control period signal SG5. The predetermined time is stored by the flash memory 109 as time information D203, and, when power supply is started, or when the time information D203 is changed, or such, the predetermined time is stored to a register 202 inside of the load timing signal generating timer 201. Further, the time information D203 indicates a value obtained from adding a predetermined margin time to the above-mentioned expected longest calculation time. The expected longest calculation time is obtained experientially.

Figure 7:
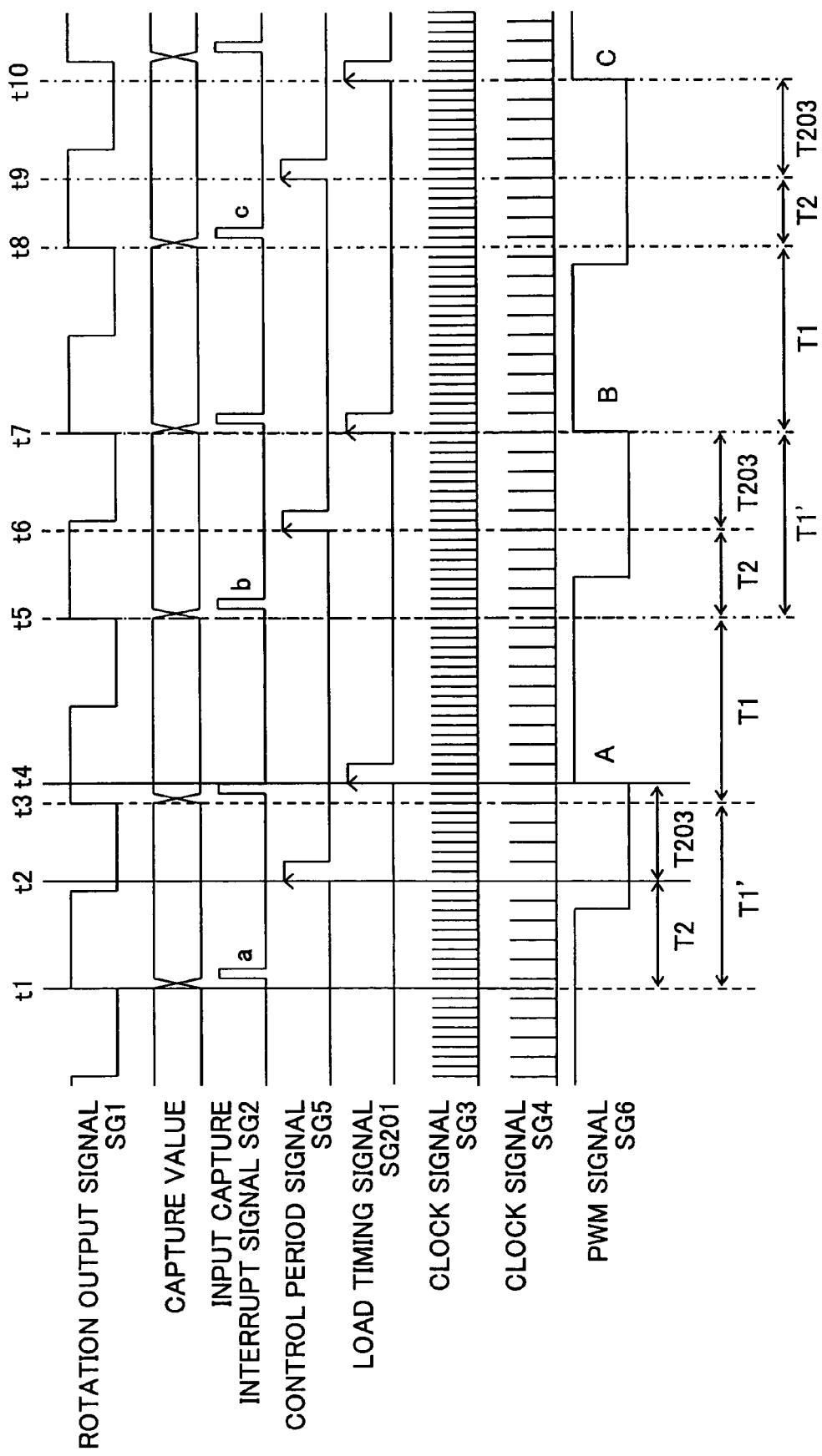
FIG. 7 depicts a timing chart of one example of output timing of each signal.

FIG. 7 depicts a timing chart illustrating output timing of each signal used in the second embodiment. Calculation of the average rotation speed V1 carried out when the input capture interrupt signal SG2 is received by the control part 102, and calculation of the interpolation time T2 carried out when the control period signal SG5 is received by the control part 102, are same as those in the first embodiment, and duplicate description is omitted.

When receiving the control period signal SG5 at a time t6 in FIG. 7 for example, the control part 102 calculates the speed control indicating value D4 and outputs the calculated speed control indicating value D4 to the memory 103. Specifically, the control part 102 calculates the interpolation time T2 (for example, between a time t5 and a time t6), and then reads, from the RAM 112, average rotation speeds V1' and V1 of the motor 21 for successive two periods T1' (for example, between a time t1 and a time t3) and T1 (for example, between the time t3 and the time t5) of the rotation output signal SG1. The control part 102 calculates a change amount in a time axis of rotation speed of the motor 21 based on the read average rotation speeds V1' and V1. Next, the control part 102 uses the calculated change amount of the average rotation speed of the motor 21, the above-mentioned average rotation speeds V1', V1, the interpolation time T2, and the time information D203 (which indicates an interpolation time T203) stored in the flash memory 109, to calculate the expected motor rotation speed V203 of a time (for example, time t7) when the PWM timer 104 reads the speed control indicating value D4 from the register 103 and reflects the speed control indicating value D4 on the PWM signal SG6.

Figure 8:
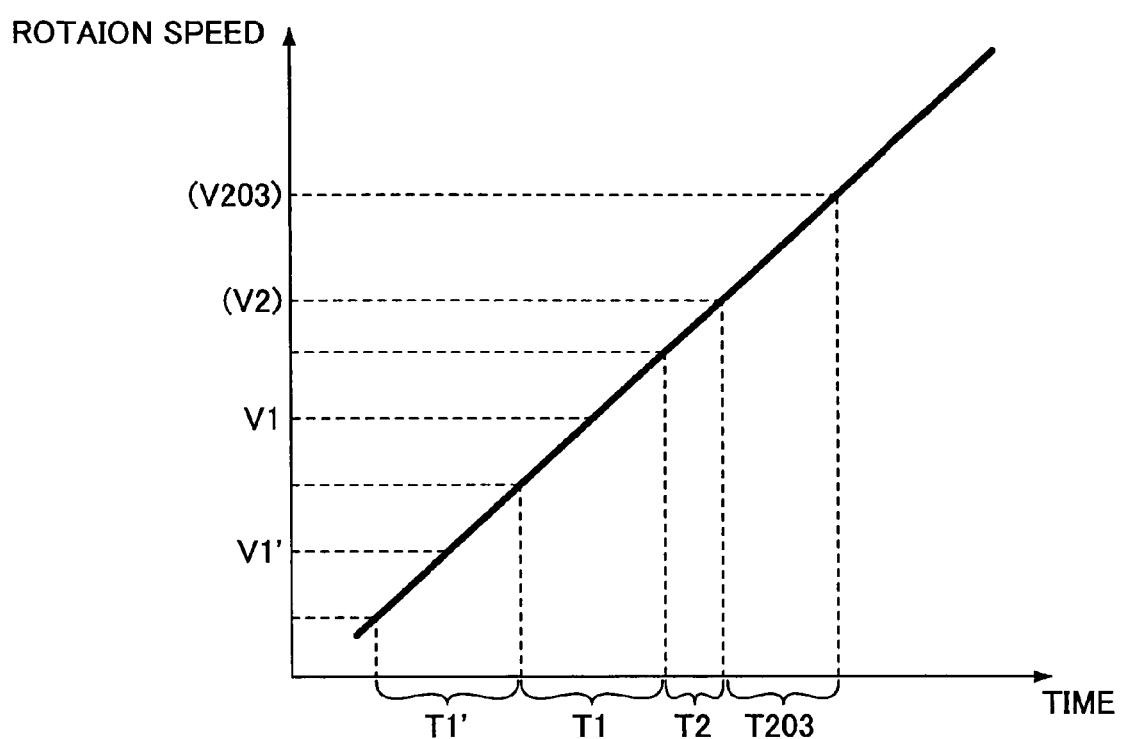
FIG. 8 depicts a graph diagrammatically illustrating a relationship between a time required for reflecting a speed control indicating value on a PWM signal and a rotation speed change.

Specifically, the same as in the first embodiment, for example, by means of interpolation based on FIG. 8, the expected motor rotation speed V203 is obtained. The time information D203 is, as mentioned above, the time obtained from adding the margin time to the expected longest calculation time of the control part 102. The time information D203 indicates a time T203 which is from when the load timing signal generating timer 201 receives the control period signal SG5, for example, at a time t6, up to when the load timing signal generating timer 201 generates and outputs the load timing signal SG201, for example, at a time t7. The control part 102 calculates the speed control indicating value D4 by means of well-known feedback control technique, based on the calculated expected motor rotation speed V203 and the given target rotation speed stored in the ROM 113. Then, the control part 102 outputs the speed control indicating value D4 to the register 103.

When receiving the control period signal SG5, the load timing signal generating timer 201 outputs the load timing signal SG201 after delaying the predetermined time T203. Specifically, when receiving the control period signal SG5, the load timing signal generating timer 201 outputs the load timing signal SG201 after counting the number of clock pulses of the clock signal SG4 corresponding to the time information T203 stored in the register 202.

When receiving the load timing signal SG201 at a time t7 for example, the PWM timer 104 reads the speed control indicating value D4 from the register 103, and stores the read speed control indicating value D4 in the register 106 inside of the PWM timer 104. PWM timer 104 generates the PWM signal SG6 based on the speed control indicating value D4 stored in the register 106, and outputs the generated PWM signal SG6 to the motor driver 105. As a result of the PWM timer 104 generating the PWM signal SG6 and outputting the PWM signal SG6 to the motor driver 105, the motor driver 105 is driven, and rotation speed of the motor 21 is controlled in rotation speed according to the speed control indicating value D4.

That is, in FIG. 7, the PWM signal SG6 starting from the time t4 indicated by "A" is generated as a result of the speed control indicating value D4 being calculated with the use of the capture value D2 read by the control part 102 at the input capture interrupt signal SG2 immediately after the time t1 indicated by "a" and the capture value obtained further before. Similarly, the PWM signal SG6 starting from the time t7 indicated by "B" is generated as a result of the speed control indicating value D4 being calculated with the use of the capture value D2 read by the control part 102 at the input capture interrupt signal SG2 immediately after the time t5 indicated by "b" and the capture value obtained further before. Similarly, the PWM signal SG6 starting from the time t10 indicated by "C" is generated as a result of the speed control indicating value D4 being calculated with the use of the capture value D2 read by the control part 102 at the input capture interrupt signal SG2 immediately after the time t8 indicated by "c" and the capture value obtained further before.

FIG. 8 depicts a graph which diagrammatically illustrates a relationship between the above-mentioned periods T1' and T1 of the rotation output signal SG1, the average rotation speeds V1' and V1 of the motor 21, and the interpolation times T2 and T203. This graph of FIG. 8 diagrammatically illustrates a relationship between a time required for the speed control indicating value D4 being reflected on the PWM signal SG6 and a change in rotation speed of the motor 21. In the second embodiment, when receiving the load timing signal SG201 (in the above-mentioned example, at the time t7), the PWM timer 104 reads the speed control indicating value D4 from the register 103. Therefore, the interpolation time T203 of FIG. 8 is the same as the time T203 which is from when the load timing signal generating timer 201 receives the control period signal SG5 up to when the load control signal generating timer 201 outputs the load timing signal SG201. The interpolation time T2 is a time which is from reception of the rotation output signal SG1, for example, the time t5, up to reception of the control period signal SG5, calculated when the control part 102 has received the control period signal SG5, for example, the time t6. That is, "the interpolation time T2"+"the interpolation time T203" equal to a time which is from when the motor control unit 22 receives the rotation output signal SG1 (in the above-mentioned example, at the time t5), up to when the speed control indicating value D4 is reflected on the PWM signal SG6 (at the time t7).

The control part 102 expects the rotation speed V203 of the motor 21 of a time (for example, the time t7) of the PWM timer 104 reflecting the speed control indicating value D4 on the PWM signal SG6, by means of interpolation based on the average rotation speed V1 in the period T1 (for example, between the times t3 and t5), the average rotation speed V1' in the period T1' (for example, between the times t1 and t3) of the rotation output signal SG1 once before the above-mentioned period T1, stored in the RAM 112, the interpolation time T2 (for example, between the times t5 and t6) and the interpolation time T203 (for example, between the times t6 and t7).

Thus, in the second embodiment, the flash memory 109 stores the time T203, which is from when the control part 102 receives the control period signal SG5 up to when the PWM timer 104 reflects the speed control indicating value D4 on the PWM signal SG6, as the time information D203. Therefore, by reading the time information D203 from the flash memory 109, the control part 102 can grasp a time (for example, the time t7) of the PWM timer 104 reflecting the speed control indicating value D4 on the PWM signal SG6, and expect rotation speed V203 of the motor 21 of the time. Therefore, the control part 102 can calculate the speed control indicating value D4 with the use of the expected rotation speed V203 of the time of the speed control indicating value D4 being reflected on the PWM signal SG6. The time information D203 is determined as a time shorter than the period of the control period signal SG5 (i.e., the interpolation time T3 in the first embodiment), based on the expected longest calculation time of the control part 102. Thereby, it is possible to reduce a possible error of the expected rotation speed V203 which may occur from a change in a change amount of rotation speed of the motor 21 during a time from when the control part 102 starts calculating the speed control indicating value D4 (for example, the time t6) up to when the PWM timer 104 reflects the speed control indicating value on the PWM signal SG6 (for example, the time t7). As a result, it is possible to control rotation speed of the motor 21 more precisely.

[Third Embodiment]

Next, with reference to FIGS. 9-12, a third embodiment will be described. It is noted that, the same reference numerals are given to configurations identical to those of the above-described first embodiment, and duplicate description will be omitted.

In the second embodiment, an error factor of the expected rotation speed V203 is reduced as a result of the time T203 which is from when the control part receives the control period signal SG5 up to when the PWM timer 104 reflects the speed control indicating value D4 on the PWM signal SG6 being set based on the expected longest calculation time. However, a time actually required by the control part 102 to calculate the speed control indicating value D4 depends on an actual load of the control part 102, more specifically, the CPU 110. Therefore, when the expected longest calculation time is set corresponding to a situation that a load of the CPU 110 is heavy, the expected longest calculation time is set longer accordingly, and thus, a time to be elapsed before reflecting the speed control indicating value D4 on the PWM signal SG6 by the PWM timer 104 after the control part 102 receives the control period signal SG5 becomes longer. As a result, an error factor the same as that for when a load of the CPU 110 is heavy may be involved even when a load of the CPU 110 is light.

In the third embodiment, a time to be elapsed before reflecting the speed control indicating value D4 on the PWM signal SG6 by the PWM timer 104 after the control part 102 receives the control period signal SG5 is variable. A load of the CPU 110 changes according to an actual operation condition of the image forming apparatus for which the motor control unit is provided. Among a copy mode, a facsimile mode, and so forth which the image forming apparatus has, a load of the CPU 110 changes as a result of the copy mode being changed between a monochrome mode and a color mode. In the third embodiment, as one example, a time to be elapsed before reflecting the speed control indicating value D4 on the PWM signal SG6 by the PWM timer 104 after the control part 102 receives the control period signal SG5 is variable according to a change in a load of the CPU 110 occurring from a change of a case between a case where the copy mode of the image forming apparatus is the monochrome mode and a case where the copy mode of the image forming apparatus is the color mode. It is noted that, a time to be elapsed before reflecting the speed control indicating value D4 on the PWM signal SG6 by the PWM timer 104 after the control part 102 receives the control period signal SG5 may be variable according to a change in a load of the CPU 110 occurring by another factor. For example, a time to be elapsed before reflecting the speed control indicating value D4 on the PWM signal SG6 by the PWM timer 104 after the control part 102 receives the control period signal SG5 may be variable according to a change in a load of the CPU 110 occurring when a mode is changed between the copy mode and the facsimile mode.

Figure 9:
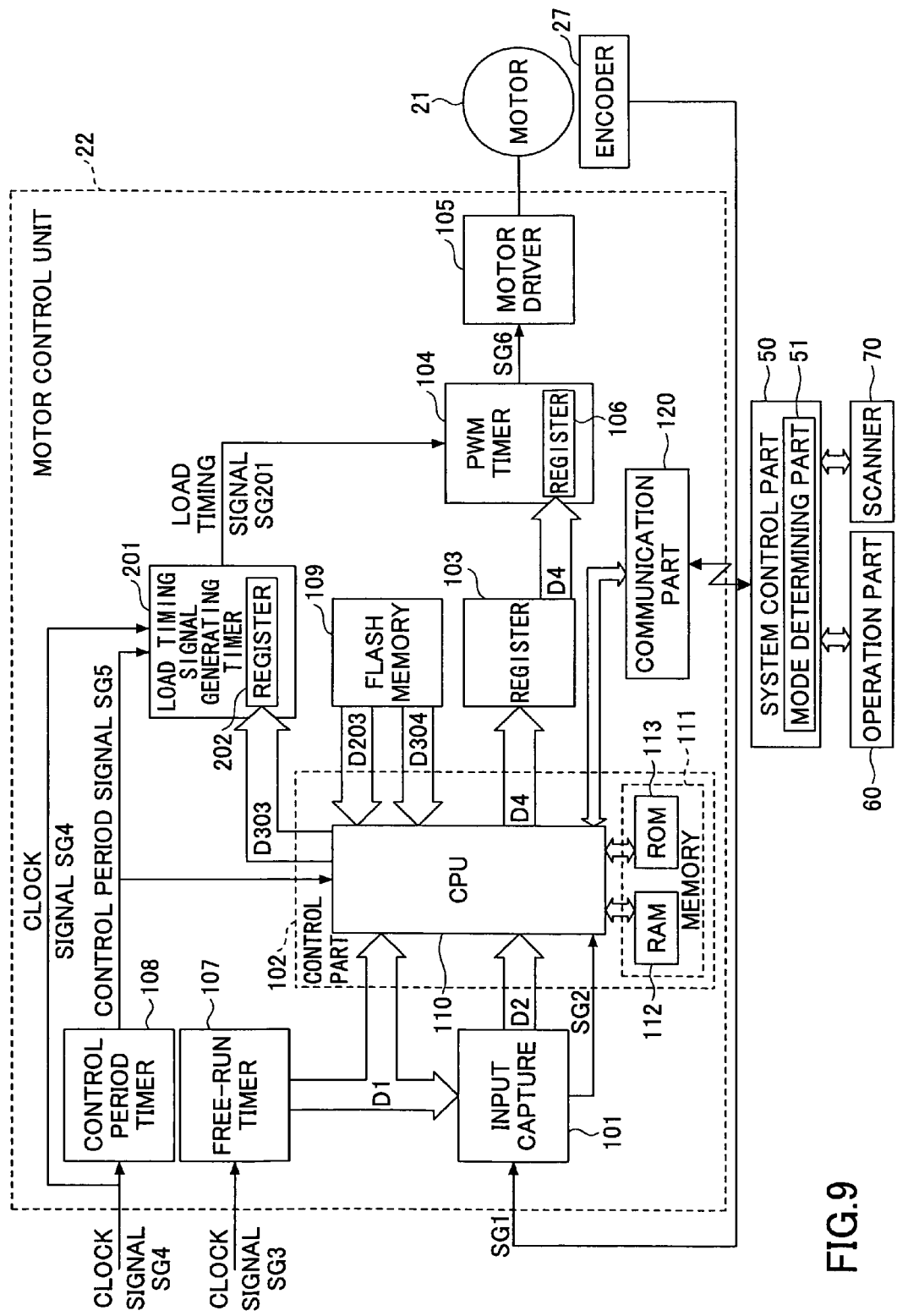
FIG. 9 depicts a block diagram of a configuration of a motor control unit in a third embodiment.

FIG. 9 depicts a block diagram illustrating a configuration of the motor control unit 22 for carrying out control of rotation speed of the motor 21 in the third embodiment. In the third embodiment, the flash memory 109 stores time information D203 set based on the expected longest calculation time and also, predetermined time information D304 (which may also be referred to as "change time information D304"). The control part 102 may change the time information D203 read from the flash memory 109 based on a load of the CPU 110, and outputs time information D303.

As shown in FIG. 9, in the third embodiment, from a system control part 50 acting as a designating part of the image forming apparatus 500 which includes the motor control part 22, information indicating whether a current image forming mode is the color mode or the monochrome mode is given to the CPU 110 of the control part 102 via a communication part 120 provided in the motor control part 22 having a function of communication with the outside. The CPU 110 stores the given information in the RAM 112. The system control part 50 has a mode determining part 51 configured to determine whether a current image forming mode is the color mode or the monochrome mode. It is noted that the system control part 50 may be configured by a computer, and the mode determining part 51 may be configured as a form of a program which the computer executes. The system control part 50 has a function of controlling operation of the entirety of the image forming apparatus 500. The system control part 50 is connected to an operation part 60 and a scanner 70 (i.e., the scanner unit 2 depicted in FIG. 1) of the image forming apparatus 500. When a user operates the operation part 60 to designate the color mode or the monochrome mode, the mode determining part 51 determines, according to the designating operation, whether a current image forming mode is the color mode or the monochrome mode. Further, when the scanner 70 of the image forming apparatus 500 reads an original image, the mode determining part 51 determines, from RGB values of image data thus obtained from the original image being read, whether the image data is of the color image or of the monochrome image. Specifically, the mode determining part 51 determines that the image data is of a monochrome image when the image data expresses only shade and light from black through white, and determines that the image data is of a color image otherwise. Then, based on the determination result, the mode determining part 51 automatically determines whether a current image forming mode is the color mode or the monochrome mode.

Figure 10:
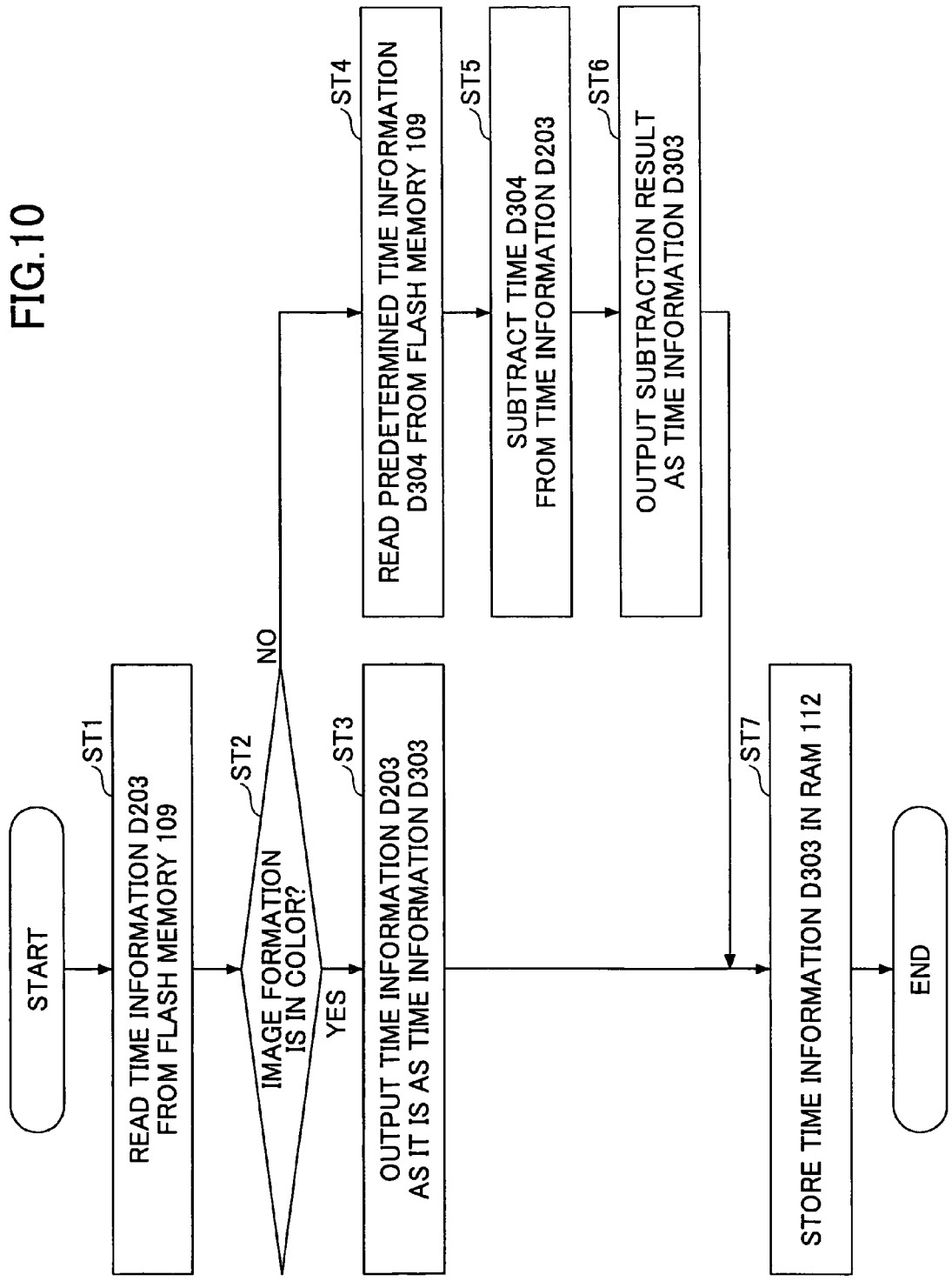
FIG. 10 depicts a flow chart illustrating a process of a control part changing time information based on a load of a CPU and outputting the time information.

FIG. 10 depicts a flow chart for a process of the control part 102 changing the time information D203 based on a load of the CPU 110, and outputting time information D303. This process is carried out when power supply to the image forming apparatus is started, or when the copy mode is changed between the monochrome mode and the color mode, or such. First, the control part 102 reads the time information D203 from the flash memory 109 in step ST1. Next, the control part 102 determines whether a current copy mode (which may also be referred to as an image forming mode) in step ST2. It is noted that the control part 102 stores information indicating whether the current copy mode is the monochrome mode or the color mode in the RAM 112 as mentioned above. When it is determined in step ST2 that the current copy mode is the color mode, the time information D203 read from the flash memory 109 is used as it is, and the control part 102 outputs the time information D203 to the register 202 of the load timing signal generating timer 201 as time information D303, in step ST3.

When it is determined in step ST2 that the current copy mode is not the color mode, the current copy mode is the monochrome mode, for which a load of the CPU 110 is light. In this case, the control part 102 shortens a time indicated by the time information D303 by a predetermined value. The predetermined value is stored in the flash memory 109 as time information D304. The control part 102 reads the time information D304 from the flash memory 109 in step ST4. Next, the control part 102 subtracts the value indicated by the time information D304 from the value indicated by the time information D203, in step ST5. The control part 102 outputs information indicating a subtraction result of step ST5 as the time information D303, to the register 202 of the load timing signal generating timer 201, in step ST6. The control part 102 stores the value of the time information D303 in the RAM 112 to be used for calculating the speed control indicating value D4, in step ST7.

It is noted that, in the third embodiment, as mentioned above for the second embodiment, the time information D203 is determined based on the expected longest calculation time, and the time information D304 is subtracted from the time information D203 for the monochrome mode for which a load of the CPU 110 is light. Thus, the time information D303 is shortened by the predetermined time indicated by the time information D304. However, it is also possible that, instead of the expected longest calculation time, an expected shortest calculation time is used as the time information D203 for the monochrome mode. In this case, time information D304 is added to the time information D203 for the color mode for which a load of the CPU 110 is heavy. Thus, the time information D303 is elongated by the predetermined time for the color mode. Further alternatively, it is also possible that, time information D203 is the expected longest calculation time, time information D304 is the expected shortest calculation time, and time information as the time information D303 to be read is switched between the time information D203 and D304 depending on whether the current copy mode is the monochrome mode or the color mode.

Figure 11:
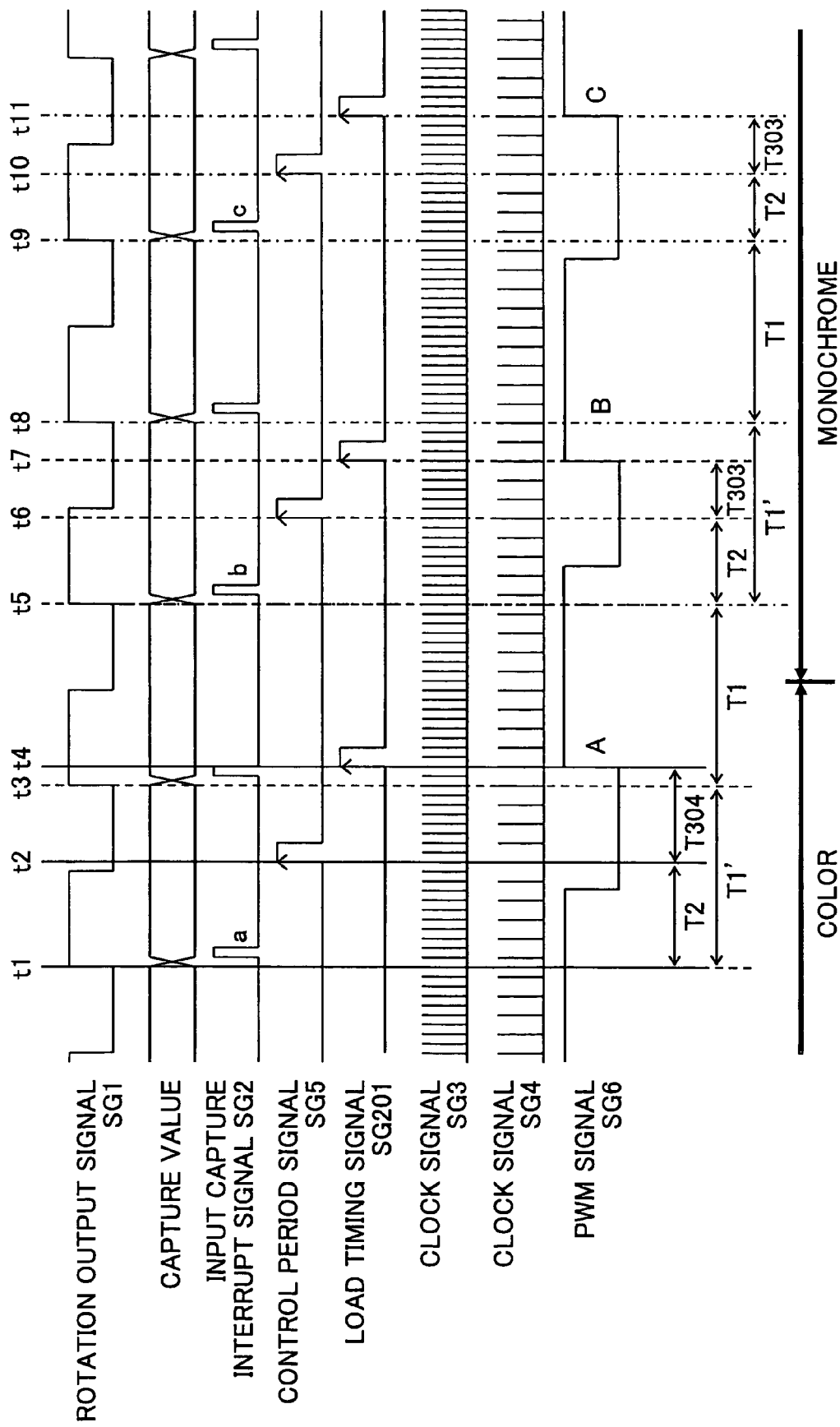
FIG. 11 depicts a timing chart of one example of output timing of each signal.

FIG. 11 depicts a timing chart illustrating output timing of each signal used in the third embodiment. Calculation of the average rotation speed V1 carried out when the input capture interrupt signal SG2 is received by the control part 102, and calculation of the interpolation time T2 carried out when the control period signal SG5 is received by the control part 102, are same as those in the first embodiment, and duplicate description is omitted.

When receiving the control period signal SG5 at a time t6 in FIG. 11 for example, the control part 102 calculates the speed control indicating value D4 and outputs the calculated speed control indicating value D4 to the memory 103. Specifically, the control part 102 calculates the interpolation time T2 (for example, between a time t5 and a time t6), and then reads, from the RAM 112, average rotation speeds V1' and V1 of the motor 21 for successive two periods T1' (for example, between a time t1 and a time t3) and T1 (for example, between the time t3 and the time t5) of the rotation output signal SG1. The control part 102 then calculates a change amount in a time axis of rotation speed of the motor 21 based on the read average rotation speeds V1' and V1. Next, the control part 102 uses the calculated change amount of the average rotation speed of the motor 21, the above-mentioned average rotation speeds V1', V1, the interpolation time T2, and the time information D303 (indicating an interpolation time T303 for the monochrome mode or T304 for the color mode, depicted in FIG. 11) stored in the RAM 112, to calculate the expected motor rotation speed V303 or V304 of a time (for example, time t7) when the PWM timer 104 reads the speed control indicating value D4 from the register 103 and reflects the speed control indicating value D4 on the PWM signal SG6. Specifically, the same as in the first embodiment, for example, by means of interpolation based on FIG. 12, the expected motor rotation speed V303 or V304 is obtained. The time information D203 is, as mentioned above, the time obtained from adding the margin time to the expected longest calculation time of the control part 102. As mentioned above, the specific value of the time information D303 differs when the copy mode is changed between the monochrome mode and the color mode. Therefore, the expected motor rotation speed differs accordingly when the copy mode is changed between the monochrome mode and the color mode.

When receiving the control period signal SG5, the load timing signal generating timer 201 outputs the load timing signal SG201 with a delay which is based on the time information D303 stored in the register 202. When receiving the load timing signal SG201 at a time t7 for example, the PWM timer 104 reads the speed control indicating value D4 from the register 103, and outputs the PWM signal SG6 to the motor driver 105. The value of the time information D303 differs when the copy mode is changed between the monochrome mode and the color mode as mentioned above. Therefore, a time (for example, between time t6 and time t7) which is from when the control part receives the control period signal SG5 up to when the PWM timer 104 reflects the speed control indicating value D4 on the PWM signal SG6 differs when the copy mode is changed between the monochrome mode and the color mode. In FIG. 11, as mentioned above, T303 is a time indicated by the time information D303 for a case of the monochrome mode, and T304 is a time indicated by the time information D303 for a case of the color mode.

That is, in FIG. 11, the PWM signal SG6 starting from the time t4 indicated by "A" is generated as a result of the speed control indicating value D4 being calculated with the use of the capture value D2 read by the control part 102 at the input capture interrupt signal SG2 immediately after the time t1 indicated by "a" and the capture value obtained further before. Similarly, the PWM signal SG6 starting from the time t7 indicated by "B" is generated as a result of the speed control indicating value D4 being calculated with the use of the capture value D2 read by the control part 102 at the input capture interrupt signal SG2 immediately after the time t5 indicated by "b" and the capture value obtained further before. Similarly, the PWM signal SG6 starting from the time t11 indicated by "C" is generated as a result of the speed control indicating value D4 being calculated with the use of the capture value D2 read by the control part 102 at the input capture interrupt signal SG2 immediately after the time t9 indicated by "c" and the capture value obtained further before.

Further, when the copy mode is changed from the color mode to the monochrome mode (for example, between time t4 and time t5 in FIG. 11) or vice versa, the period of the PWM signal SG6 changes accordingly. However, generally speaking, an image forming process is not carried out immediately after such a change of the copy mode. Therefore, there is little possibility that an image formed by the image forming apparatus is adversely affected by such a change of the period of the PWM signal SG6.

Figure 12:
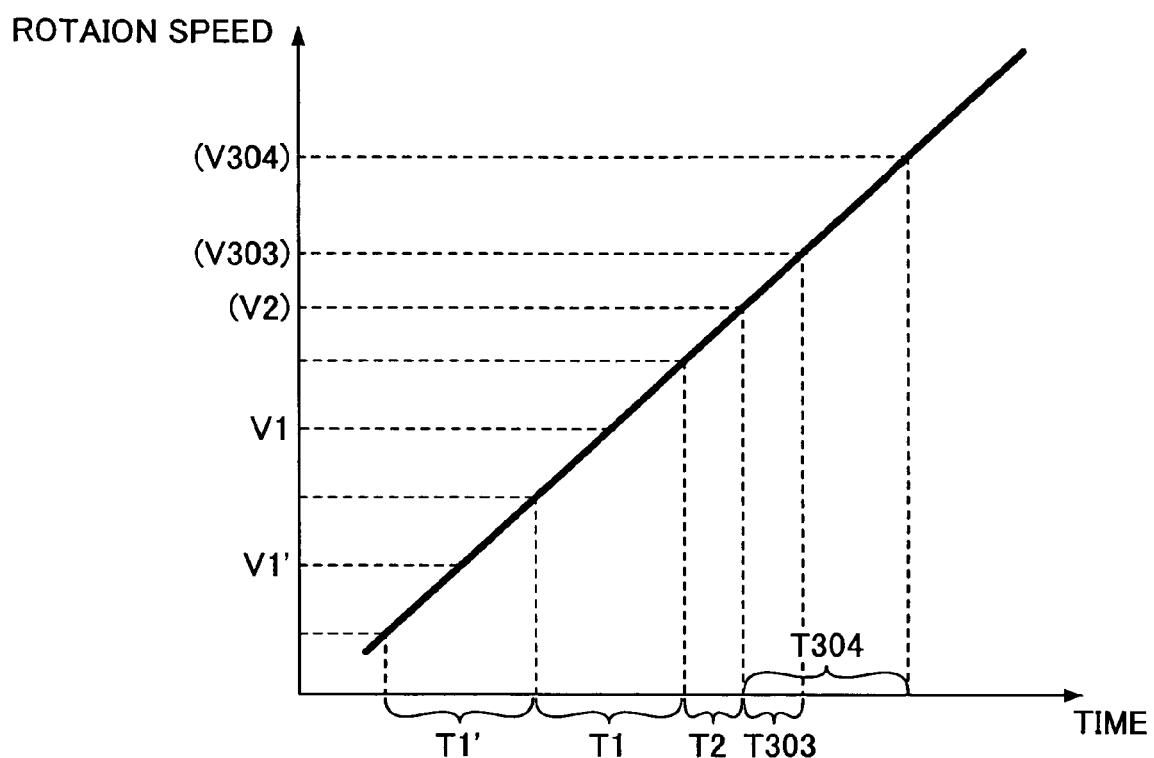
FIG. 12 depicts a graph diagrammatically illustrating a relationship between a time required for reflecting a speed control indicating value on a PWM signal and a rotation speed change.
Figure 13:
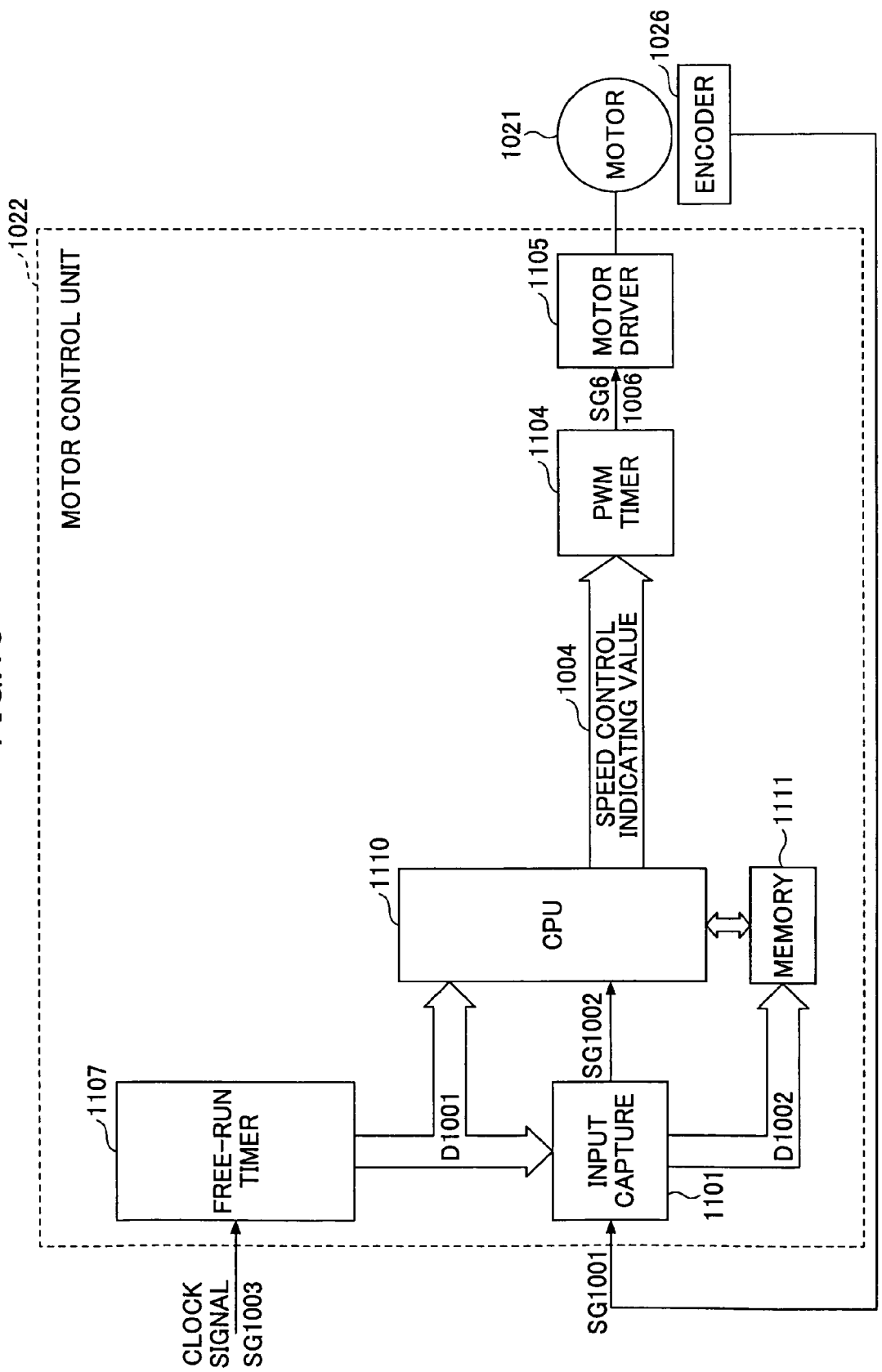
FIG. 13 depicts a block diagram of a motor control unit in the prior art.

FIG. 12 depicts a graph which diagrammatically illustrates a relationship between the above-mentioned periods T1' and T1 of the rotation output signal SG1, the average rotation speeds V1' and V1 of the motor 21, and the interpolation time T2 and the interpolation time T303 or T304. This graph of FIG. 12 diagrammatically illustrates a relationship between a time elapsed before the speed control indicating value D4 being reflected on the PWM signal SG6 and a change in rotation speed of the motor 21. In the third embodiment, when receiving the load timing signal SG201, the PWM timer 104 reads the speed control indicating value D4 from the register 103, stores the speed control indicating value D4 in the register 106, and generates the PWM signal SG6 with the use of the speed control indicating value D4 stored in the register 106. When receiving the control period signal SG5, the load timing signal generating timer 201 outputs the load timing signal SG201 with a delay which is based on the time information D303 stored in the register 202. Therefore, the interpolation time T303 or T304, which is from when the control part 102 receives the control period signal SG5 up to when the PWM timer 104 reflects the speed control indicating value D4 on the PWM signal SG6, is the same as the time indicated by the time information D303 stored in the RAM 112. As mentioned above, the time information D303 is changed by the control part 102 based on a load of the CPU 110.

When the copy mode is the color mode, a load of the CPU 110 is large, and thus, a value indicated by the time information D303 is T304. When the copy mode is the monochrome mode, a load of the CPU 110 is small, and thus, a value indicated by the time information D303 is T303 which is shorter than the above-mentioned value T304. The interpolation time T2 is a time which is from reception of the rotation output signal SG1, for example, the time t5, up to reception of the control period signal SG5, calculated when the control part 102 has received the control period signal SG5, for example, the time t6. That is, "the interpolation time T2"+ "the interpolation time T303 or T304" equal to a time which is from when the motor control unit 22 receives the rotation output signal SG1 (in the above-mentioned example, at the time t5), up to when the speed control indicating value D4 is reflected on the PWM signal SG6 (at the time t7).

The control part 102 expects the rotation speed V303 or V304 of the motor of a time (for example, the time t7) of the PWM timer 104 reflecting the speed control indicating value D4 on the PWM signal SG6, by means of interpolation based on the average rotation speed V1 in the period T1 (for example, between the times t3 and t5), the average rotation speed V1 in the period T1' (for example, between the times t1 and t3) of the rotation output signal SG1 once before the above-mentioned period T1, stored in the RAM 112, the interpolation time T2 and the interpolation time T303 or T304 (for example, between the times t5 and t7).

Thus, in the third embodiment, the time information D303 indicating a time which is from a time when the control part 102 receives the control period signal SG5 up to a time when the PWM timer 104 reflects the speed control indicating value D4 on the PWM signal SG6 is stored in the register 202 and the RAM 112. The time information D303 is calculated with the use of the time information D203 which is determined based on the expected longest calculation time and the change time information D304 for the time information D203 stored in the flash memory 109. That is, when a load of the CPU 110 is large, the time information D203 is used as it is as the time information D303, and, when a load of the CPU 110 is small, a value obtained from subtracting the change time information D304 from the time information D203 is output as the time information D303. Thereby, it is possible to change a time to be elapsed before reflecting the speed control indicating value D4 on the PWM signal SG6 after the control part 102 receives the control period signal SG6, according to a load of the CPU 110. That is, when a load of the CPU 110 is small and thus, a required calculation time of the CPU 110 is short, it is possible to shorten a time to be elapsed before reflecting the speed control indicating value D4 on the PWM signal SG6 after the control part 102 receives the control period signal SG6. Therefore, it is possible to reduce a possible error of the expected rotation speed of the motor 21, which error may occur because of a possible change in a change amount of rotation speed during the above-mentioned time. Thus, it is possible to control rotation speed of the motor 21 with high accuracy.

Each of the above-mentioned first, second and third embodiments is the color image forming apparatus in a type of a so-called indirect transfer system in which, a toner image is first transferred to the intermediate transfer belt (i.e., an intermediate medium) from the photosensitive member unit, a color image is formed as a result of toner images of respective colors being overlaid together on the intermediate medium, and then, the color image is transferred therefrom to recording paper at once by means of the secondary transfer roller. However, it is not necessary to limit thereto. The present invention may also be realized in the same way as a color image forming apparatus in a type of a so-called direct transfer system in which a toner image of each single color formed in each image carrying member (i.e., a photosensitive drum, for example) is directly transferred to recording paper, conveyed by means of an intermediate medium (i.e., a conveyance belt), in sequence.

It is noted that, in each embodiment described above, the motor control unit is used in the image forming apparatus, as an example. However, it is not necessary to limit thereto. A motor control unit according to the present invention may also be used for an apparatus other than such an image forming apparatus, as long as the apparatus using the motor control unit carries out, by means of the motor control unit, control of rotation speed of a motor based on a rotation output signal output according to rotation of the motor. As another embodiment, an electric power steering system used for a vehicle may be realized.

Further, in each embodiment described above, the PWM timer 104 converts the speed control indicating value D4 into the PWM signal SG6, and transmits the PWM signal SG6 to the motor driver 105, to control rotation speed of the motor 21. However, it is not necessary to limit to such a configuration. For example, instead of the PWM timer 104, a D-A (i.e., digital to analog) converter may be used, which converts the speed control indicating value as a digital signal into an analog signal having a corresponding DC (i.e., direct current) level, and the analog signal may be used to control rotation speed of the motor.

The present invention is not limited to the specifically disclosed embodiments, and variations and modifications may be made without departing from the scope of the present invention.

The present application is based on Japanese priority applications Nos. 2007-311527 and 2008-298822, filed Nov. 30, 2007 and Nov. 21, 2008, respectively, the entire contents of which are hereby incorporated herein by reference.

What is claimed is:

1. An image forming apparatus comprising:
a conveying part configured to convey, during an image forming process, transfer paper or a toner image; and
a motor control unit which controls rotation speed of a motor which drives the conveying part, wherein
the motor control unit is configured to carry out control of rotation speed of the motor based on a rotation output signal output according to rotation of the motor, and
the motor control unit includes:
a storing part configured to store time information indicating time required for reflecting a speed control indicating value on rotation speed of the motor, the speed control indicating value being read by a motor driving part and then, being reflected on rotation speed of the motor by the motor driving part;
a rotation speed information generating part configured to generate rotation speed information based on reception of the rotation output signal;
a speed control indicating value generating part configured to generate the speed control indicating value based on the time information and the rotation speed information; and
the motor driving part configured to read the speed control indicating value at a period which is based on the time information, and drive the motor based on the speed control indicating value.

2. The image forming apparatus as claimed in claim 1, wherein:
the time information indicates a period of a control period signal which provides an opportunity to start generation of the speed control indicating value by the speed control indicating value generating part; and
the motor driving part, based on reception of the control period signal, reads the speed control indicating value.

3. The image forming apparatus as claimed in claim 1, wherein
the motor control unit further includes:
a control period signal generating part configured to generate a control period signal at a predetermined period; and
a load timing signal generating part configured to generate a load timing signal by converting the control period signal into the load timing signal, wherein:
the speed control indicating value generating part generates the speed control indicating value based on reception of the control period signal; and
the motor driving part reads the speed control indicating value based on reception of the load timing signal.

4. The image forming apparatus as claimed in claim 1, having a plurality of modes respectively requiring different loads borne by the motor control unit, and carrying out an image forming process in a mode designated from the plurality of modes, further comprising:
a designating part configured to designate a mode from the plurality of modes; and
a time information setting part configured to set the time information based on the mode designated by the designating part.

5. The image from apparatus as claimed in claim 4, wherein:
the plurality of modes comprise a monochrome mode and a color mode; and
in a case of the monochrome mode, a time indicated by the time information is shorter than a time indicated by the time information for a case of the color mode.

6. A motor control method used in an image forming apparatus which includes a conveying part configured to convey, during an image forming process, transfer paper or a toner image; and a motor control unit which controls rotation speed of a motor which drives the conveying part, the motor control method comprising:
carrying out control of rotation speed of the motor based on a rotation output signal output according to rotation of the motor;
generating rotation speed information based on reception of the rotation output signal output according to rotation of the motor;
generating a speed control indicating value based on rotation speed information and time information which is stored by a predetermined storing part and indicates a time required to be elapsed before reflecting the speed control indicating value in rotation speed of the motor, the speed control indicating value being read for driving the motor and then, being reflected in rotation speed of the motor; and
reading the speed control indicating value at a period which is based on the time information, and driving the motor based on the speed control indicating value.

* * * * *